United States Patent
Murakami et al.

(10) Patent No.: US 7,151,716 B2
(45) Date of Patent: Dec. 19, 2006

(54) MAGNETO-OPTICAL RECORDING MEDIUM HAVING A TRANSFER CONTROL LAYER

(75) Inventors: Motoyoshi Murakami, Hirakata (JP); Takeshi Sakaguchi, Osaka (JP); Yasumori Hino, Ikoma (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/902,328

(22) Filed: Jul. 29, 2004

(65) Prior Publication Data

US 2005/0002318 A1     Jan. 6, 2005

Related U.S. Application Data

(62) Division of application No. 10/308,791, filed on Dec. 3, 2002, now Pat. No. 6,791,908, which is a division of application No. 09/603,492, filed on Jun. 23, 2000, now Pat. No. 6,504,797.

(30) Foreign Application Priority Data

Jun. 25, 1999 (JP) .................................. 11-180908
Oct. 28, 1999 (JP) .................................. 11-307706

(51) Int. Cl.
    *G11B 11/00* (2006.01)

(52) U.S. Cl. ............................... 369/13.08; 369/13.42

(58) Field of Classification Search ............ 369/13.05, 369/13.06, 13.07, 13.08, 13.42, 13.41, 13.09; 428/694 ML, 694 MM, 64.3
See application file for complete search history.

(56) References Cited

U.S. PATENT DOCUMENTS

| | | | |
|---|---|---|---|
| 5,623,458 A * | 4/1997 | Matsumoto et al. ..... 369/13.46 |
| 5,707,727 A | 1/1998 | Takahashi et al. | |
| 5,723,227 A * | 3/1998 | Matsumoto et al. ..... 369/13.45 |
| 5,896,350 A * | 4/1999 | Tamanoi et al. ......... 369/13.44 |
| 5,901,118 A | 5/1999 | Iketani et al. | |
| 5,920,538 A | 7/1999 | Il'Yashenko | |
| 5,968,678 A | 10/1999 | Tanase et al. | |
| 5,982,715 A | 11/1999 | Mori et al. | |
| 6,018,511 A | 1/2000 | Nishikiori et al. | |
| 6,020,079 A * | 2/2000 | Matsumoto et al. ..... 369/13.44 |
| 6,042,954 A | 3/2000 | Hirokane et al. | |
| 6,205,092 B1 | 3/2001 | Yamaguchi et al. | |
| 6,278,668 B1 | 8/2001 | Hirokane et al. | |
| 6,403,148 B1 | 6/2002 | Shiratori et al. | |

(Continued)

FOREIGN PATENT DOCUMENTS

JP     5-81717     4/1993

*Primary Examiner*—Tan Dinh
(74) *Attorney, Agent, or Firm*—RatnerPrestia

(57) ABSTRACT

A magneto-optical recording medium, including a recording layer, a transfer control layer magnetically coupled to the recording layer, and a reproduction layer. The recording layer includes a recording magnetic domain in which information is recorded by a magnetization direction vertical to the surface of the film. The reproduction layer includes a reproduction magnetic domain in which information in the recording layer is transferred and formed as a magnetization direction by magnetic coupling. The direction of magnetization of the recording magnetic domain of the recording layer and the direction of magnetization of the transfer control layer corresponding to the recording magnetic domain are in opposite directions in at least part of the range of temperatures less than a transfer temperature where the reproduction magnetic domain is transferred to the reproduction layer. The Curie point temperature of the transfer control layer is higher than this transfer temperature.

8 Claims, 28 Drawing Sheets

U.S. PATENT DOCUMENTS 6,519,211 B1    2/2003   Murakami et al.
6,556,516 B1 *  4/2003   Shimazaki et al. ...... 369/13.02

2003/0107956 A1 *  6/2003   Awano et al. ............ 369/13.43

* cited by examiner 0.8mW 1.4mW 2.2mW

Film thickness of the first magnetic layer ( nm )

MAGNETO-OPTICAL RECORDING MEDIUM HAVING A TRANSFER CONTROL LAYER

This application is a divisional of U.S. patent application Ser. No. 10/308,791, filed Dec. 3, 2002, now U.S. Pat. No. 6,791,908, which is a divisional of application Ser. No. 09/603,492, filed Jun. 23, 2000, now U.S. Pat. No. 6,504,797.

BACKGROUND OF THE INVENTION

1. Field of the Invention

The present invention relates to a magneto-optical recording medium and reproducing method thereof to carry out recording and reproducing information by using a laser light by applying a magneto-optical effect, more specifically relates to the magneto-optical recording medium and reproducing method thereof to make a high density recording signal possible.

2. Related Art of the Invention

In magneto-optical recording being a high density, writable, recording and reproducing method, a part of layered magnetic films (a recording film structure) of a magneto-optical recording medium is locally heated to a Curie temperature or a temperature above a compensation temperature by radiating laser light, and an information signal is recorded in a predetermined part of the magnetic film contained in the recording film structure by forming a recordable magnetic domain in an external magnetic field, and this information is read by using a magneto-optical effect.

One of such magneto-optical recording system for the magneto-optical recording medium is the magnetic field modulation recording system. In this system, thermal magnetic recording is performed in a predetermined part by using an external magnetic field of which direction has been modulated according to a recording signal after raising entirely the temperature of a recording magnetic film by radiating a laser light of a certain strength using a semiconductor laser or the like. The other of the recording system is the light intensity modulation recording system. In this system, thermal magnetic recording is performed in the direction of the external magnetic field by raising the temperature of the recording magnetic film of a predetermined part by radiating the laser light which has been modulated according to the strength of the recording signal, applying the external magnetic field of a certain strength.

At the time of reproducing the recorded signal, when the laser light (reproducing light) of which polarization direction is arranged to be identical, is condensed on the magneto-optical recording medium, the direction of magnetization of recording magnetic domain is detected as the rotation of the polarization direction of the reflected light or transmitted light by a magneto-optical effect caused by the magneto-optical recording medium. By this effect, the information signal recorded is reproduced.

However, in the conventional magneto-optical recording medium, when the size of the recording magnetic domain becomes smaller than that of the light spot (reproducing-light spot) of a reproducing light on the magneto-optical recording medium, not only the recording magnetic domain to be reproduced, but also the recording magnetic domain located in front and back of the position becomes contained in the reproducing-light spot, i.e., a detection range. Therefore, some problems occur exemplified as follows: the reproducing signal becomes small to lower an S/N ratio or the reproducing signal is not outputted, because of an interference by those recording magnetic domains.

To solve these problems, a magnetic field modulation recording system using magnetically induced super resolution has been proposed to read the reproducing signal from a part of domain of the reproducing-light spot.

(I) The following is a description of a magneto-optical record reproducing system by using the magnetically induced super resolution named a double mask system which is a system of the magnetically induced super resolution.

FIG. 12 shows a configuration in reproducing by the double mask system. FIG. 12(A) is a plane view of showing a part of track of the magneto-optical recording medium 60 in the conventional double mask system. 12(B) is a sectional view showing the configuration (particularly the direction of magnetization) of a recording film structure of the magneto-optical recording medium 60.

As shown in the sectional view of FIG. 12(B), the recording film structure of the magneto-optical recording medium 60 is configured by including a reproduction layer 63, a reproduction supporting layer 64, a middle layer 65, and a recording layer 66, which are layered on a substrate (not illustrated) in order. An arrow 160 shown in the FIG. 12(B) is a movement direction along with the track of the magneto-optical recording medium 60. Arrows illustrated in respective layers 63 to 66 are show directions of magnetization in respective positions.

This conventional magneto-optical recording medium 60 requires reproducing magnetic field generating means 61 applied to the domain of the reproducing-light spot 67, initialized magnetic field generation means 62 located in the frontal position of the reproduction magnetic field generating means 61 in the movement direction 160. Hereafter, reference numerals 61 and 62 are used for a description of a reproducing operation of generated magnetic field generated by the reproducing magnetic field generating means 61 and an initialized magnetic field generated by the initialized magnetic field generation means 62, respectively. The following is the magneto-optical recording medium 60 of the double mask system configured by such manner.

First, a signal (information) is previously recorded by thermal magnetization as the recording magnetic domain 69 in the recording layer 66. Before the laser light is radiated in reproducing, the direction of magnetization of the reproduction layer 63 is arranged in the direction of the initialized magnetic field 62. At the time of reproducing, as shown in the FIG. 12(A), the reproducing laser light is radiated to the rotating magneto-optical recording medium 60 to make the reproducing-light spot 67 and raise a temperature of the recording film structure. According to this step, the distribution of temperatures as shown in the FIG. 12(A) occurs on the magneto-optical recording medium 60 to form a low temperature region 71, a high temperature region 72, and a intermediate temperature region 70.

The direction of magnetization of the reproduction layer 63 in the low temperature region 71 near a room temperature is arranged in the direction of the initialized magnetic field 62 by blocking of a exchange coupling between the reproduction layer 63 and the recording layer 66 by the middle layer 65. In the intermediate temperature region 70, the exchange coupling between the reproduction layer 63 and the recording layer 66 becomes dominant by decrease in coercive force of the reproduction layer 63 according to temperature rise caused by radiation of the reproducing laser light and also by transition of the middle layer 65 from a in-plane magnetized film having in-plane magnetic anisotropy to a perpendicular magnetized film having perpendicular magnetic anisotropy. Therefore, The direction of magnetization of the reproduction layer 63 is arranged in the direction of magnetization of the recording layer 66.

In the high temperature region 72 of the reproduction supporting layer 64 becoming a Curie temperature Tc, the exchange coupling between the reproduction layer 63, the middle layer 65, and the recording layer 66 is blocked by extinction of magnetization of the reproduction supporting layer 64 to arrange the direction of magnetization of the reproduction layer 63, of which coercive force is small, to the direction of the reproducing magnetic field 61. Therefore, a recording magnetic domain 69 is masked by both the low temperature region 71 and the high temperature region 72 inside the reproducing-light spot 67 and information can be read as a reproducing signal through the reflected light from only the recording magnetic domain 69 presented in the intermediate temperature region 70.

The direction of the reproducing magnetic field 61 is an opposite direction to the initialized magnetic field 62. After the reproducing-light spot 67 passed, the temperature of the recording layer 66 dropped again and the recording layer 66 and the reproduction layer 63 are blocked again by the middle layer 65.

According to such magneto-optical recording medium 60, even in a smaller recording magnetic domain 69 than the reproducing-light spot 67, recorded information can be reproduced with a high density without occurrence of interference by frontal and back recording magnetic domain 69.

However, the above described magneto-optical recording medium 60 has a defect in that the initialized magnetic field 62 or the reproducing magnetic field 61 are required to arrange the magnetization direction of the reproduction layer 63 to an identical direction.

Thus, a reproducing method has been proposed by using a magnetically induced super resolution to solve the above described defect.

As a method unnecessary of the initialized magnetic field or the reproducing magnetic field, a method proposed in Japanese Patent Laid-Open No. 5-81717 will be described below with reference to drawings 13(A) and 13(B). The FIG. 13(A) is the planeview showing a part of the track of the magneto-optical recording medium 80 disclosed in the above described publication and 13(B) is a sectional view showing the configuration of the recording film structure (particularly of the direction of magnetization) of the magneto-optical recording medium 80.

As shown in the sectional view of the FIG. 13(B), the magneto-optical recording medium 80 has the recording film structure containing a reproduction layer 83 and recording layer 85 formed on the substrate (not illustrated). A middle layer 84 is put between the reproduction layer 83 and the recording layer 85. The arrow 180 shown in the FIG. 13(A) shows the movement direction along with the track of the magneto-optical recording medium 80. Arrows illustrated in respective layers 83 and 85 of the FIG. 13(B) show the magnetization direction in respective positions. In the magneto-optical recording medium 80, differing from the magneto-optical recording medium 60 previously described, the magnetic film having in-plane magnetic anisotropy is used as the reproduction layer 83 at room temperature.

As same as the magneto-optical recording medium 60, the reproducing-light spot 87 is formed by radiating the reproducing laser light in reproducing information of the magneto-optical recording medium 80. When the reproducing laser light is radiated to the magneto-optical recording medium 80 during rotation, the temperature distribution of the recording film structure containing a reproduction layer 83 and recording layer 85 does not form rotation symmetry to the center of the circle of the reproducing-light spot 87. A radiated part of the reproducing-light spot 87 and the right-hand end of the back of the reproducing-light spot 87 become the high temperature region 90. The external part, included in the reproducing-light spot 87, of the high temperature region 90 becomes the low temperature region 91.

Followings are description of reproducing operation of the magneto-optical recording medium 80 configured as described above.

The recorded information is previously recorded in the recording layer 85 as a recording magnetic domain 89 smaller than the reproducing-light spot 87 by the thermal magnetic recording. The reproduction layer 83 is the in-plane magnetized film at room temperature and is the magnetic film having characteristic of becoming the perpendicular magnetized film only in the part of the high temperature region 90 inside the reproducing-light spot 87. The high temperature region 90 and the low temperature region 91 are formed by temperature rise caused by radiation of the reproducing laser light. In the high temperature region 90, the reproduction layer 83 changes to the perpendicular magnetized film and is arranged to the magnetization direction of the recording layer 85 by magnetic coupling through the intermediate layer 84. The reproduction layer 83 changes again to the in-plane magnetized film by drop of temperature caused by movement of the magneto-optical recording medium 80. Therefore, the reproduction layer 83 (the in-plane magnetized film) in the low temperature region 91 inside the reproducing-light spot 87 works as a mask and the recording magnetic domain 89 of the recording layer 85 is transferred only from the high temperature region 90 of the reproducing-light spot 87. Thus, the signal of a recording mark (the recording magnetic domain 89) smaller than the reproducing-light spot 87 can be detected.

According to the steps described above, in the magneto-optical recording medium 80, information of the recording magnetic domain 89 smaller than the reproducing-light spot 87 can be reproduced without the use of the initialized magnetic field and the reproduction magnetic field.

In the above described magneto-optical recording medium 80 by using the in-plane magnetized film in the reproduction layer 83, there is an effect of capability of making the initialized magnetic field and the reproducing magnetic field unnecessary, however, there is the following defect.

First, the direction of magnetization of the reproduction layer 83 is attracted to the direction of the magnetization of the recording layer 85 by magnetic interaction between the reproduction layer 83 and the recording layer 85 even in the low temperature region 91 masked. Therefore, an ideal surface magnetizing direction is not maintained resulting in having a vertical component of magnetization. Resultingly, transfer occurs in a domain unnecessary of transfer of the recording magnetic domain 89 to cause a deficiency of resolution and a noise in reproducing.

Second, variation of the power of the reproducing laser light (a reproducing power) changes a region, to which the recording magnetic domain 89 is transferred, to deteriorate reproducing characteristic by the wave form interference of a transfer domain, because a critical temperature, in which the reproduction layer 83 changes from the in-plane magnetized film to the perpendicular magnetized film, is constant.

In addition, change of an ambient temperature such as the temperature in a drive and the like requires change of setting of reproducing power. However, in the case where particularly the ambient temperature rises, requires reducing the reproducing power to decrease in temperature difference between the critical temperature and the room temperature capable of transfer of the signal of the recording layer 85. As the result, the region (the low temperature region 91) masked by the reproduction layer 83, that has become the in-plane magnetized film, reduces. Therefore, there are problems in which the reproducing signal is deteriorated by decrease in resolution and the signal transfer in the recording layer 85 becomes insufficient.

In other words, the high temperature region varies according to variation of the above described variation of reproducing power and the above described variation of ambient temperature.

(II) On the other hand, in the magneto-optical recording medium by using the above described magnetically induced super resolution system, a rare earth-transition metal alloy is mainly used for the magnetic layer.

FIG. 27 shows the vertical component of a magnetic moment of the sub-lattice of the transition metal in the magneto-optical recording medium by using the magnetically induced super resolution system based on the conventional art. Arrows 1300 and 1400 in a first magnetic layer 1100 and a second magnetic layer 1200 represent the vertical components of the magnetic moments of the sub-lattices of the transition metals of the first magnetic layer 1100 and the second magnetic layer 1200, respectively.

The first magnetic layer 1100 is the in-plane magnetized film at room temperature and changes from the in-plane magnetized film to the perpendicular magnetized film according to temperature rise. The second magnetic layer 1200 is a film consisting of such as TbFeCo and DyFeCo and having a large perpendicular magnetic anisotropy at room temperature. Recorded information is kept depending on upward or downward direction of the magnetizing domain of this second magnetic layer 1200 toward the surface of the film.

When a light beam is radiated from the substrate side to the magneto-optical recording medium with the above described configuration, a temperature gradient occurs in a beam spot 1700 to present a region of a high temperature and a region of a low temperature. In this condition, the first magnetic layer 1100 does not contribute to pole Kerr effect to the utmost because it becomes the in-plane magnetized film and the recorded information stored in this second magnetic layer 1200 is masked to disappear, in the region of the low temperature in the beam spot 1700.

On the other hand, in the region of the high temperature in the beam spot 1700, the magnetically induced super resolution is realized by that the first magnetic layer 1100 becomes the perpendicular magnetized film to cause a magnetostatic coupling with the second magnetic layer 1200. Therefore, Information stored in recorded in the second magnetic layer 1200 is transferred to the first magnetic layer 1100.

As a whole of the beam spot 1700, the magnetically induced super resolution is realized by that recorded information in the second magnetic layer 1200 is transferred to a smaller region in comparison with the size of the beam spot 1700, because of a part masked by the first magnetic layer 1100.

The magneto-optical recording medium by using such magnetically induced super resolution system can satisfy requirement of high density by a narrowed track. In the above described configuration, a transition region occurs as an intermediate condition to change from the in-plane magnetized film to the perpendicular magnetized film in the beam spot 1700. Namely, a whole film does not change abruptly from the in-plane magnetized film to the perpendicular magnetized film in a predetermined temperature, but a certain range of temperature becomes transition region.

In the transition region, the first magnetic layer has not become a perfect in-plane magnetized film and perfect masking of the recorded information kept by the second magnetic layer is impossible. On the contrary, the first magnetic layer is not a perfect perpendicular magnetized film in the transition region and a magnetostatic coupling force with the second magnetic layer is small to be difficult to yield a large signal.

Therefore, the first magnetic layer in the transition region cannot mask sufficiently the recorded information kept by the second magnetic layer to increase cross talk from an adjacent track. In addition, the first magnetic layer in the transition region has a weak magnetostatic coupling force with the second magnetic layer to make sufficient transfer of the recorded information from the second magnetic layer impossible.

Furthermore, the first magnetic layer is frequently prepared by using a material, a rare earth metal generally expensive. This makes the cost of material high in the case where the magnetic layer is prepared thick and productivity is worsen. Thus, a cheap magneto-optical recording medium is difficult to be provided.

SUMMARY OF THE INVENTION (I) The present invention was created in consideration of the problem in that the high temperature region varies according to the variation of the above described reproducing power and the variation of the above described ambient temperature. The objects thereof were (1) to provide a magneto-optical recording medium having reproducing characteristics of high resolution and high performance, in which two incompatible characteristics, the stable magnetically induced super resolution masking characteristic and the transfer performance of a recording signal to a reproduction layer, can be simultaneously improved, even when the ambient temperature varies, and (2) to provide a reproducing method of the magneto-optical recording medium suitable for a high density recording by using the above described magneto-optical recording medium.

A magneto-optical recording medium according to one aspect of the present invention comprises:

a recording layer having a recording magnetic domain in which information is recorded according to a magnetization direction vertical to a surface of a film;

a reproduction layer in which information recorded in said recording layer is transferred and formed as a reproduction magnetic domain of the magnetization direction vertical to the surface of the film by magnetic coupling; and a transfer control layer magnetically coupled to said recording layer, wherein a direction of magnetization of said recording layer and the direction of magnetization of said transfer control layer corresponding to said recording layer are in opposite direction in a part of temperature range less than a temperature in which said reproduction magnetic domain is transferred to said reproduction layer, and said transfer control layer becomes a Curie point or higher in at least a part of temperature range higher than said transfer temperature.

A magneto-optical recording medium according to the another aspect of the present invention comprises:

a recording layer having a recording magnetic domain in which information is recorded according to a magnetization direction vertical to a surface of a film;

a reproduction layer in which information recorded in said recording layer is transferred and formed as a reproduction magnetic domain of the magnetization direction vertical to the surface of the film by magnetic coupling; and a transfer control layer magnetically coupled to said recording layer, wherein a direction of magnetization of said recording layer and the direction of magnetization of said transfer control layer corresponding to said recording layer are opposite directions in a part of temperature range less than a temperature in which said reproduction magnetic domain is transferred to said reproduction layer, and the direction of magnetization of said recording layer and the direction of magnetization of said transfer control layer corresponding to said recording layer are coincide in at least a part of temperature range higher than said transfer temperature.

The magneto-optical recording medium according to still another aspect of the above present invention is characterized in that the direction of magnetization of said recording layer and the direction of magnetization of said transfer control layer corresponding to said recording layer are in opposite directions in the temperature range less than said transfer temperature.

The magneto-optical recording medium according to any one of the above present invention is characterized in that a domain enlarged layer having a shrinking function is formed on said reproduction layer.

Particularly, according to this configuration, even the magneto-optical recording medium including an reproducing expansion layer of the magnetic domain having a characteristic of performing a magnetic wall movement in an area near a transfer temperature at a shrinking action or a reproducing operation of the reproduction magnetic domain (transfer domain), can perform smoothly transfer of the reproducing signal and form the reproduction magnetic domain (transfer domain) enlarged than the recording magnetic domain of the recording layer to transfer and read.

The Curie temperature of the above described transfer control layer may be at least lower than the Curie temperature of either the above described recording layer or the above described reproduction layer. According to this, the magnitude of the magnetostatic field can be abruptly increased for transferring the signal of the recording layer to the reproduction layer.

Alternatively, the Curie temperature of the above described transfer control layer may be lower than the compensation temperature of the above described reproduction layer. Further, the compensation temperature of the above described transfer control layer may be lower than the compensation temperature of the above described reproduction layer. By this, the reproduction magnetic domain transferred to the reproduction layer can be stably detected.

Alternatively, the above described transfer control layer may be put far from a light incident surface in comparison with the above described recording layer.

Alternatively, an intermediate layer made of a nonmagnetic material may be further put between the above described reproduction layer and the above described recording layer.

Alternatively, a layer made of an dielectric material may be further put as the intermediate layer made of the above described nonmagnetic material. By this, the recording magnetic domain can be effectively transferred and read by the magnetostatic field from the recording layer to the reproduction layer.

Alternatively, the intermediate layer made of a magnetic material and having the Curie temperature lower than both the Curie temperature of the above described reproduction layer and the Curie temperature of the above described recording layer may be put between the above described reproduction layer and the above described recording layer. By this, the masking effect of the reproduction layer or the transfer characteristic of the recording magnetic domain can be improved by using the magnetic exchange coupling force between the recording layer and the reproduction layer.

Alternatively, the above described recording layer may have the compensation temperature between the room temperature and the transfer temperature.

Alternatively, an heat sink layer made of a metal may be further formed. By this, temperature distribution for the recording film can be controlled to yield a transferred and reproduced signal of the higher signal quality.

A magneto-optical recording medium according to yet another aspect of the present invention comprises:

a recording layer having a recording magnetic domain in which information is recorded according to a magnetization direction vertical to a surface of a film;

a reproduction layer in which information recorded in said recording layer is transferred as a reproduction magnetic domain of the magnetization direction vertical to the surface of the film; and a transfer control layer magnetically coupled to said recording layer, wherein the magneto-optical recording medium is configured to have a region which becomes a critical temperature in which magnetization of said recording layer and magnetization of said transfer control layer corresponding to said recording layer are opposite in direction each other in a light spot of a reproducing light radiated at the time of reproduction of said information recorded, and coincide in magnitude.

Preferably, the magnitude of an added magnetization yielded by adding the magnetization of the above described recording layer and the magnetization of the above described transfer control layer is 100 emu/cc or less in a temperature region above the room temperature and under the above described critical temperature. By this, the reproduction layer, which yields the masking effect as the magnetic film having magnetic anisotropy in the direction to inside of the film surface, can have a satisfactory masking characteristic in the reproducing-light spot.

Further, the present invention according to still yet another aspect is a reproducing method for the magneto-optical recording medium comprising at least a recording layer having a recording magnetic domain in which information is recorded in a magnetization direction vertical to a surface of a film, a reproduction layer in which information recorded in the above described recording layer is transferred in a magnetization direction vertical to a surface of a film as a reproduction magnetic domain, and a transfer control layer coupled magnetically with the above described recording layer, wherein a reproducing-light spot is formed by radiating a reproducing light to the above described magneto-optical recording medium in reproducing information recorded in the above described magneto-optical recording medium, a domain becoming a critical temperature, in which magnetization of the above described recording layer and magnetization of the above described transfer control layer corresponding to the above described recording layer are opposite in directions and consistent in magnitude, is formed in the above described reproducing-light spot, and a signal of the transfer domain formed on the above described reproduction layer in a region of temperature higher than the above described critical temperature is reproduced.

(II) Furthermore, a still further aspect of the present invention is created in consideration of a problem of increase in cross talk from the above described adjacent track to provide the magneto-optical recording medium and a reproducing method thereof with a purpose of realizing a high density by narrowing the track.

In order to achieve the above described purpose, the present invention is the magneto-optical recording medium comprising a first magnetic layer that becomes a in-plane magnetized film at least in a room temperature and becomes a perpendicular magnetized film in a predetermined temperature higher than the above described room temperature and a second magnetic layer having perpendicular magnetic anisotropy, wherein the above described first magnetic layer has a thickness allowing passing a light beam, the above described second magnetic layer is arranged allowing magnetic coupling with the above described first magnetic layer, and when the incident light beam for reproducing reaches from the above described first magnetic layer side, rotation of polarized plane of the light beam reflected off the above described first magnetic layer and rotation of polarized plane of the light beam passed through the above described first magnetic layer and reflected off the above described second magnetic layer compensate each other to cancel them.

Furthermore, the present invention is the reproducing method of the magneto-optical recording medium carrying out reproducing information recorded in the above described second magnetic layer by coupling magnetically the above described first magnetic layer and the above described second magnetic layer by radiation of the light beam to the magneto-optical recording medium, wherein the reproducing method of the magneto-optical recording medium comprises a step, in a high temperature region in the above described beam spot, of transferring information recorded in the above described second magnetic layer to the above described first magnetic layer by making the above described first magnetic layer to the perpendicular magnetized film and by coupling magnetically the above described first magnetic layer and the above described second magnetic layer and a step, in a low temperature region in the above described beam spot, performing reproducing the above described information by that the rotation of polarized plane of the light beam reflected off the above described first magnetic layer and the rotation of polarized plane of the light beam passed through the above described first magnetic layer and reflected off the above described second magnetic layer compensate each other to cancel them.

According to a yet further aspect of the present invention, in the magneto-optical recording medium using the magnetically induced super resolution system, making the film thickness of the first magnetic layer thinner allows canceling the rotation angles of the polarization surfaces in the transition region from the in-plane magnetized film to the perpendicular magnetized film, masking sufficiently the recorded information of the second magnetic layer in temperatures from the room temperature to a high temperature region in the beam spot, and reproducing sufficiently the recorded information in the high temperature region in the beam spot.

BRIEF DESCRIPTION OF THE DRAWINGS

FIG. 2(A) is a plan view showing a part of a track and FIG. 2(B) is a sectional view showing the structure of (particularly direction of magnetization) a recording film;

FIG. 8(A) is a plan view showing a part of a track and FIG. 8(B) is a sectional view showing the structure of (particularly direction of magnetization) a recording film;

FIG. 12(A) is a plan view showing a part of the track, FIG. 12(B) is a sectional view showing the structure (particularly the direction of magnetization) of a recording film;

FIG. 13(A) is a plan view showing a part of the track, FIG. 13(B) is a sectional view showing the structure (particularly the direction of magnetization) of a recording film;

DESCRIPTION OF SYMBOLS

Figure 1:
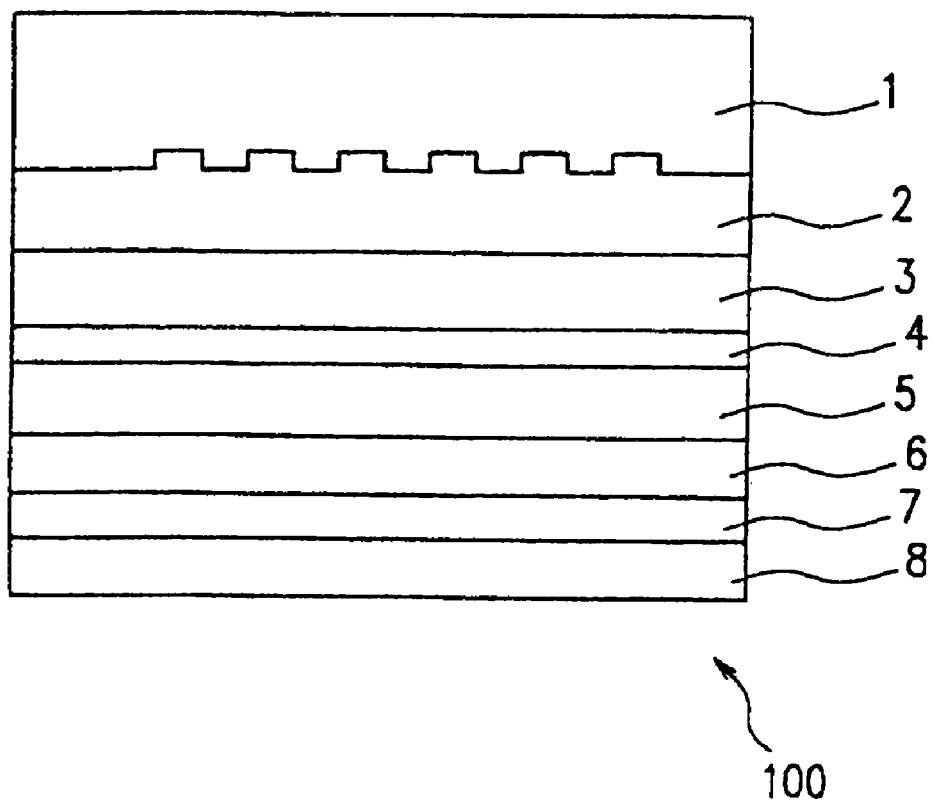
FIG. 1 is a sectional view showing diagrammatically a configuration of a magneto-optical recording medium of a first embodiment of the present invention.

1 Substrate
2 Dielectric material layer
3 Reproduction layer
4 Intermediate layer
5 Recording layer
6 Transfer control layer
7 Protecting layer
8 Overcoat layer
9 Reproducing-light spot
10 High temperature region
11, 12 Low temperature region
13 Recording magnetic domain
21 Substrate
22 Dielectric material layer
23 Enlarged layer of magnetic domain
24 Reproduction layer
25 Intermediate layer
26 Recording layer
27 Transfer control layer
28 Dielectric material layer
29 Heat sink layer
30 Overcoat layer
31 Low temperature region
32 High temperature region
33 Middle temperature region
34 Recording magnetic domain
344 Enlarged recording magnetic domain
35 Reproducing-light spot
101 First magnetic layer
102 Second magnetic layer
103 Vertical component of a magnetic moment of the sub-lattice of the transition metal of the first magnetic layer
104 Vertical component of a magnetic moment of the sub-lattice of the transition metal of the second magnetic layer
105 Reproductive track
106 Abutting track
107 Beam spot
108 Substrate
109 First dielectric material layer
110 Second dielectric material layer
111 Third dielectric material layer
112 Overcoat layer
113 Heat releasing layer

DETAILED DESCRIPTION OF THE PREFERRED EMBODIMENTS

The present invention will be described below with specific preferred embodiments in detail. The invention may be embodied in other specific forms without departing from the spirit or essential characteristics thereof. The following embodiment is therefore to be considered in all respects as illustrative and not restrictive.

(I)
(Embodiment 1)
Herewith, a first preferred embodiment of the present invention will be described below with reference to the drawings.

FIG. 1 is a sectional view showing diagrammatically the configuration of the magneto-optical recording medium 100 of the first embodiment of the present invention.

In the FIG. 1, reference numeral 1 denotes a poly-carbonate-made optical disk substrate having a guide groove for tracking guide of the light spot. On the top of the optical disk substrate 1, a dielectric layer 2 made of SiN is formed for enhancing and a GdFeCo reproduction layer 3, an SiN intermediate layer 4, a TbFeCd recording layer 5, a TbFe transfer control layer 6 are further sequentially layered thereon to make a four layer structure of the recording film structure. Furthermore, a SiN protecting layer 7 and an overcoat layer 8 epoxy acrylate are put on this structure.

The recording film structure composed of respective 3 to 6 layers is for realizing a recording and reproducing method to increase a record density by using the magnetically induced super resolution system (hereafter, CAD system) named CAD (Center Aperture Detection) to detect the recorded information from only the high temperature region of the reproducing-light spot and has a multilayer structure with a magnetic coupling to increase reproducing signal magnitude in case of reproduction of high density record with the diameter of the domain equal to or below 0.5 µm at the time of reproduction.

In forming the magneto-optical recording medium 100 having the structure of the FIG. 1, first, a Si target is subjected to reactive sputtering in an atmosphere of a mixture of argon gas and nitrogen gas using a direct current magnetron sputtering machine to form an SiN film 2 of 80 nm, which is, on a poly-carbonate substrate 1 having a pre groove which is a guide groove for tracking guide of the light spot. Further, a 20 mm GdFeCo film 3 is formed in argon gas using a GdFeCo target followed by forming a 15 nm SiN film 4 by reactive sputtering. Furthermore, 35 nm TbFeCo recording layer 5 and 35 nm TbFe transfer control layer 6 using respective targets of TbFeCo and TbFe are layered, respectively. In addition, a 50 nm SiN protecting layer 7 is formed and subsequently, a 6 µm UV curing resin of epoxyacrylate is coated by spin coating to receive ultra-violet light radiation to harden to make an overcoat layer 8 and finally, yield the magneto-optical recording medium 100 of the first embodiment of the present invention.

Figure 2:
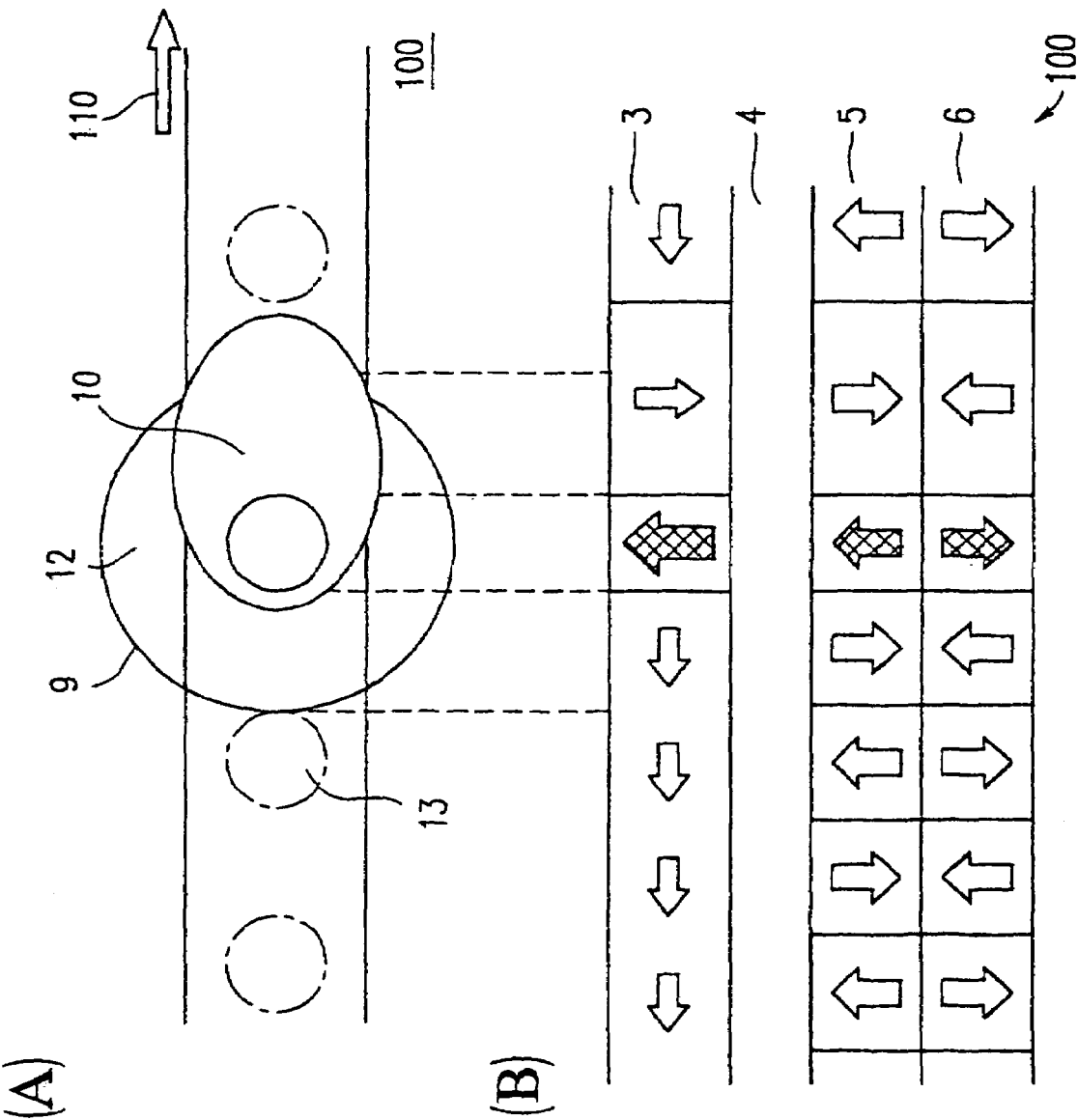
FIG. 2(A), 2(B) are views illustrating a reproducing operation of the magneto-optical recording medium in the first embodiment of the present invention.

FIG. 2 shows a configuration at the time of reproduction of the magneto-optical recording medium 100 by the CAD system in the present embodiment; (a) is a plan view showing a part of a track of the magneto-optical recording medium 100, and (b) is a sectional view showing the structure of (particularly direction of magnetization) a recording film of the magneto-optical recording medium 100.

The principle of reproduction by the CAD system is briefly described below.

As shown in the FIG. 2(B), the structure of the recording film of the magneto-optical recording medium 100 is composed of reproduction layer 3, intermediate layer 4, recording layer 5, and transfer control layer 6. In the FIG. 2(A), reference numeral 9 denotes the reproducing-light spot, 12 denotes a mask region, and 10 denotes a reproduction region. The arrow 110 shown in FIG. 2(A) is the direction of movement along with the track of the magneto-optical recording medium 100 and arrows illustrated in respective layers 3, 5, and 6 of the FIG. 2(B) show the direction of magnetization in respective points.

Figure 3:
FIG. 3(A) to FIG. 3(C) are views showing the results of measurements of a Kerr hysteresis loop, which is a magnetic property in a single layer condition of the GdFeCo reproduction layer used in the first embodiment of the present invention; in different temperatures realized by changing the intensity of the reproducing laser light.
Figure 3:
Figure 3:

FIGS. 3(A) to 3(C) show the results of measurements of a Kerr hysteresis loop, which is a magnetic property in a single layer condition of the GdFeCo reproduction layer 3 used in the magneto-optical recording medium 100 of the present invention, by changing the strength of the reproducing laser light. Specifically, FIG. 3(A) to FIG. 3(C) are the results of measurements of temperature around the room temperature (strength of the laser light is 0.8 mW) 100° C. (strength of the laser light is 1.4 mW) and 170° C. (strength of the laser light is 2.2 mW) respectively.

As shown in the FIG. 3(A) to FIG. 3(C), magnetic anisotropy in the direction vertical to the film surface of the reproduction layer 3 increases according to temperature rise. In other words, in comparing the FIG. 3(A) to FIG. 3(C), the reproduction layer 3 is the magnetic film having magnetic anisotropy in the direction of the film surface in the low temperature around the room temperature shown in the FIG. 3(A), however, as shown in (B) and (C), magnetic anisotropy in the direction vertical to the film surface is induced according to temperature rise in accordance with increase in the reproducing power particularly to make the perpendicular magnetized film at a certain temperature or more as shown in (C).

When the reproduction layer 3 becomes the perpendicular magnetized film by temperature rise, as shown in the FIG. 2(B), the recording magnetic domain 13 of the recording layer 5 is transferred to the reproduction layer 3 to read through the intermediate layer 4 by magnetic interaction from the side of the recording layer 5. The reproduction layer 3 becomes the in-plane magnetized film in the range from the room temperature up to a temperature region 11 lower than a reproduction temperature in which the magnetic domain of the recording layer 5 is transferred, because the magnetic anisotropy in the surface direction of the film surface is large. Thus, information recorded in the recording layer 5 as vertically magnetizing characteristic is not transferred to the reproduction layer 3 resultingly to realize masking action.

Repeatedly, when the magneto-optical recording medium 100 rotates in the direction of the arrow 110 to pass the recording layer 5 through the reproducing laser light spot 9, the temperature of the recording layer 5 gradually rises. In the low temperature region 12 around the front of the reproducing laser light spot 9, the reproduction layer 3 acts as a mask as the in-plane magnetized film. In the high temperature region 10 above a temperature in which the reproduction layer 3 becomes the in-plane magnetized film, the reproduction magnetic domain 13 is transferred and formed according to the direction of magnetization of the recording layer 5. Subsequently, after the reproducing laser light spot 9 passed, the temperature of the recording film structure drops again, the recording magnetic domain of the recording layer 6 is not transferred, and the reproduction layer 3 returns to the condition of the in-plane magnetized film.

In the magneto-optical recording medium 100, based on such principle of reproduction, of the present embodiment, the front temperature region 11 of the reproducing laser light spot 9 and adjacent temperature region 12 act as masks without use of a bias field at the time of reproduction, as described with reference to FIGS. 2(A) and 2(B). Transfer and reproduction can be carried out using the signal of recording magnetization of the recording layer 5 by the action of magnetic coupling force with the recording layer 5 in the temperature, in which the magnetic anisotropy in the surface vertical direction of the reproduction layer 3 increased.

In other words, information recorded in the recording layer 5 can be read only from the high temperature region 10.

Therefore, in the magneto-optical recording medium 100 having the structure of the present embodiment, the signal from a region smaller than the reproducing-light spot 9 can be reproduced. Specifically, recording and reproducing in the domain length of 0.4 μm become possible. In addition, in this reproducing method, reproduction is carried out by a laser power of a 2.5 mW that is higher than normal one, because a difference in temperature between the low temperature regions 11 and 12 in which the reproduction layer 3 is the in-plane magnetized film and functions as a mask (surface masking) and the high temperature region 10 in which the signal is transferred.

For the first magnetic layer 101, the magneto-optical recording medium of the present invention, the rare-earth elements-transition metal alloy, in which composition is dominant in the sub-lattice magnetic moment of rare-earth elements, was used. The first magnetic layer 101 has magnetic characteristics, shown in the FIGS. 16(A), 16(B), and 16(C), according to the temperature, respectively.

Figure 16:
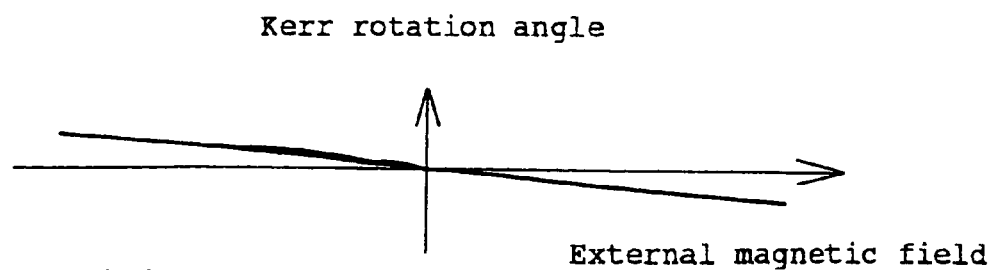
FIG. 16(A) is a view showing a relationship between a Kerr rotation angle of a first magnetic layer and an external magnetic field of the magneto-optical recording medium according to the present invention, at room temperature.
FIG. 16(B) is a view showing a relationship between the Kerr rotation angle of the first magnetic layer and an external magnetic field of the magneto-optical recording medium according to the present invention, at a temperature where a in-plane magnetized film changes to a perpendicular magnetized film.
FIG. 16(C) is a view showing a relationship between the Kerr rotation angle of the first magnetic layer and an external magnetic field of the magneto-optical recording medium according to the present invention, at a high temperature.
Figure 16:
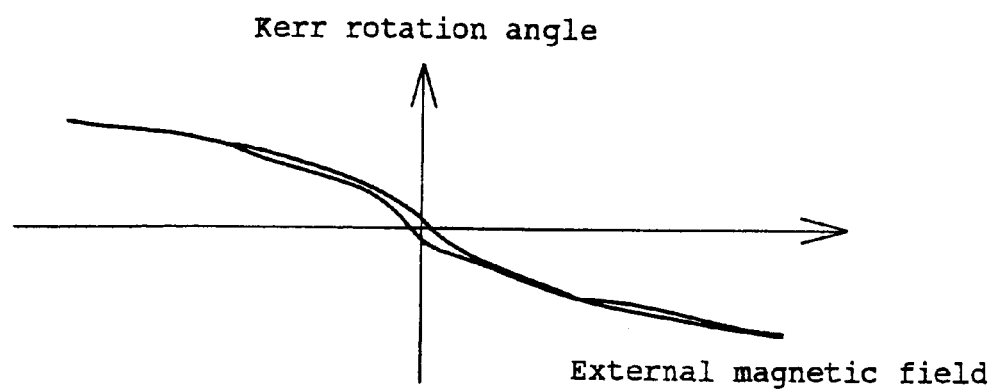
Figure 16:
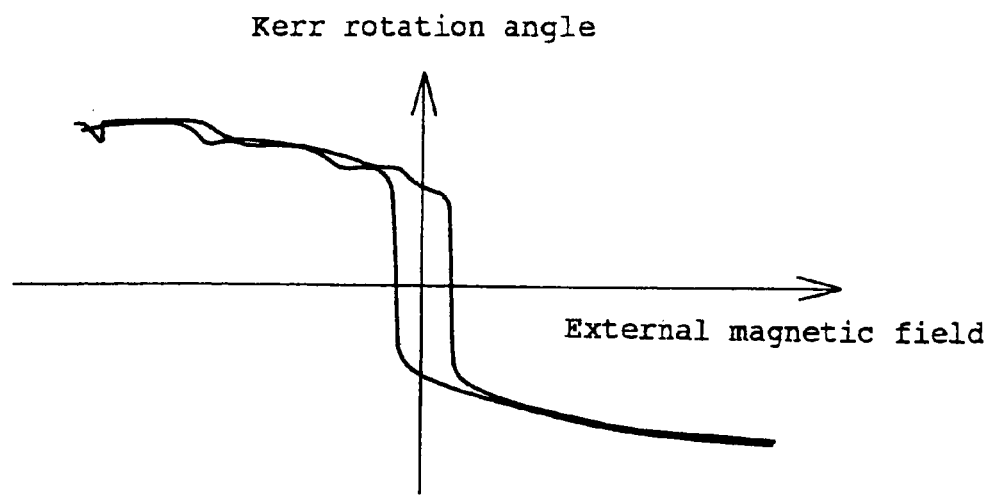

FIG. 16(A) is a view showing a relationship between a Kerr rotation angle and an external magnetic field at room temperature. The first magnetic layer 101 is the in-plane magnetized film at room temperature. Therefore, magnetization is not easily directed to the vertical direction in the external magnetic field in a small magnetic direction. For directing the magnetization to the vertical direction, very large external magnetic field is required.

FIG. 16(B) is a view showing a relationship between the Kerr rotation angle and the external magnetic field in a temperature in which the surface direction of magnetization changes to the vertical direction of magnetization. In this temperature range, applying a certain magnitude of the external magnetic field directs magnetization of all films to the vertical direction, however, acts as the in-plane magnetized film to the small external magnetic field to make the Kerr rotation angle small.

FIG. 16(C) is a view showing a relationship between the Kerr rotation angle of the external magnetic field in a high temperature. In the high temperature, change to the perpendicular magnetized film occurs, saturation occurs in the small external magnetic field, and a large Kerr rotation angle is yielded. For the first magnetic layer 101, the film, which is the in-plane magnetized film at room temperature and changes to the perpendicular magnetized film according to rising to the high temperature, was used as shown in FIGS. (A), (B), and (C).

In the first magnetic layer 101, the temperature range, in which the in-plane magnetized film changes to the perpendicular magnetized film, can be set by changing proportion of respective elements composing the first magnetic layer. As a rule, increasing the proportion of rare-earth elements raises the temperature region in which the in-plane magnetized film changes to the perpendicular magnetized film. In contrast, decreasing the temperature region, in which the in-plane magnetized film changes to the perpendicular magnetized film, can be achieved by reducing the proportion of rare-earth elements.

Figure 17:
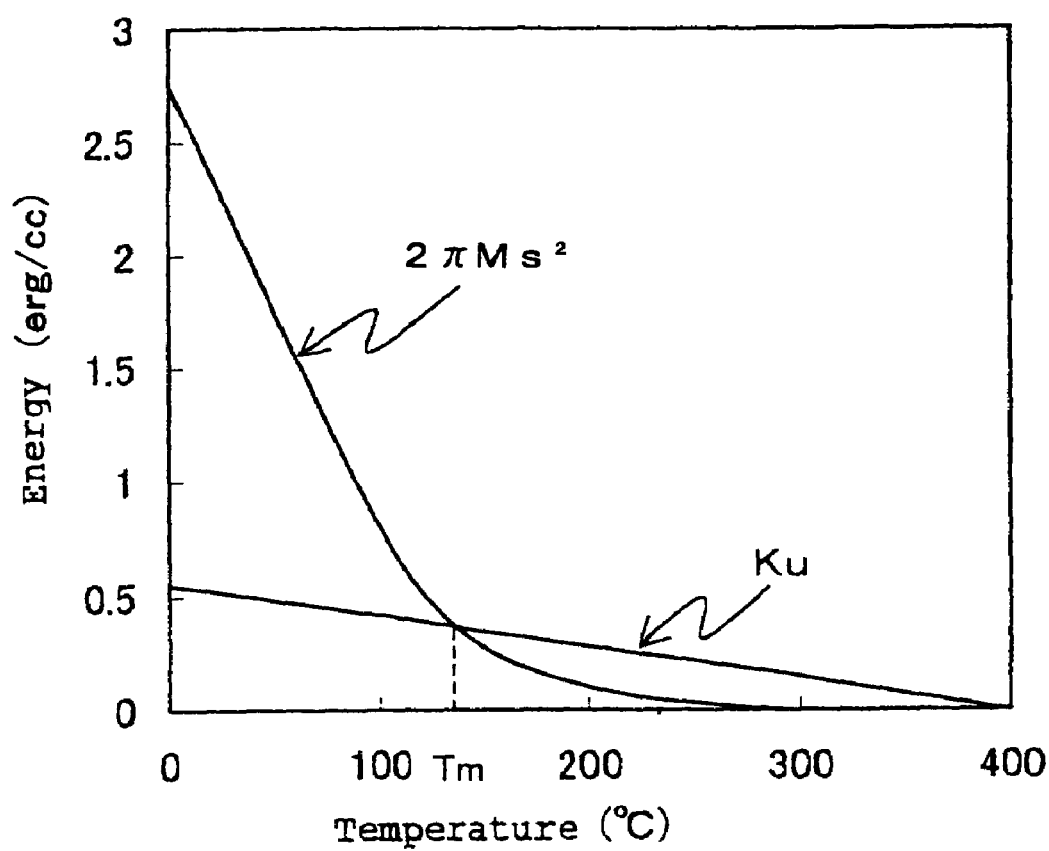
FIG. 17 is a view showing a relationship of a perpendicular magnetic anisotropy energy Ku and an demagnetizing field energy $2\pi Ms^2$, of the first magnetic layer of the magneto-optical recording medium according the present invention, with temperatures.

FIG. 17 is a view showing a relationship of a perpendicular magnetic anisotropy energy Ku and an demagnetizing field energy $2\pi Ms^2$ of the first magnetic layer 101, which is the in-plane magnetized film in the above described room temperature and changes to the perpendicular magnetized film in the high temperature, with temperatures. As a rule, in case of the above described magnetic layer, the following formula is held if the perpendicular magnetic anisotropy energy and saturation magnetization are assumed as Ku and Ms, respectively.

$$Ku < 2\pi Ms^2 \quad \text{[Equation 1]}$$

Where, $2\pi Ms^2$ is demagnetizing field energy. If it is assumed that Ku is smaller than $2\pi Ms^2$, the magnetic layer becomes the in-plane magnetized film. If it is assumed that the temperature in which Ku and $2\pi Ms^2$ coincide is Tm, the low temperature region less than Tm becomes the in-plane magnetized film in such first magnetic layer 101. As shown in the FIG. 17, when the temperature of magnetic layer is increasing, the magnitude of Ku and $2\pi Ms^2$ come close and if it becomes higher than Tm, the next formula is held.

$$Ku > 2\pi Ms^2 \quad \text{[Equation 2]}$$

The magnetic layer becomes the vertical magnetized film, if the formula is held.

Figure 18:
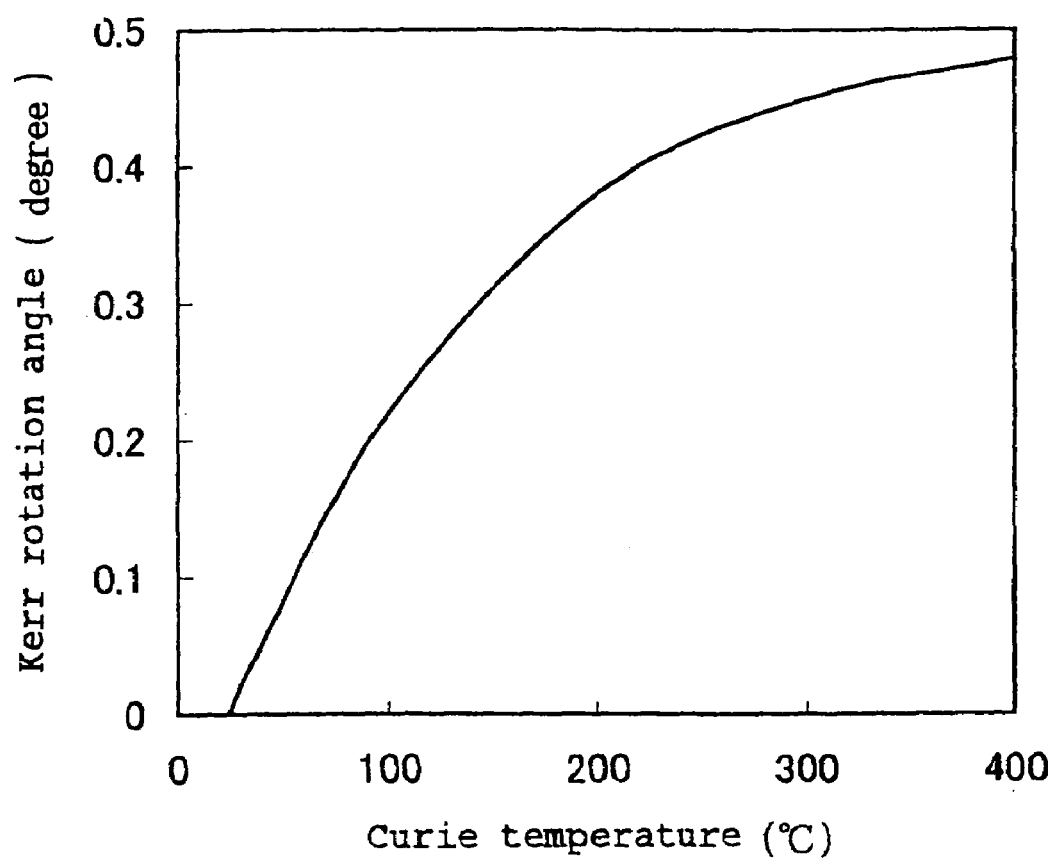
FIG. 18 is a view showing a relationship between the Kerr rotation angle of the first magnetic layer and Curie temperature of the reproduction layer of the magneto-optical recording medium according the present invention.

The first magnetic layer 101 is the layer contributing to reproducing of information recorded in the second magnetic layer 102 and therefore, a larger Kerr rotation angle is better. FIG. 18 is a view showing a relationship between the Kerr rotation angle and the Curie point. As shown in the FIG. 18, a higher Curie temperature increases the Kerr rotation angle.

In the recording film structure in the magneto-optical recording medium 100 having the structure of the present embodiment, The GdFeCo reproduction layer 3 has a composition rich in rare-earth elements at room temperature and a 300° C. of the Curie point, and the compensation temperature of 270° C. The intermediate layer is the SiN film and then, the interaction works between it and the recording layer 5 by the static magnetic field. The TbFeCo recording layer 5 has the composition rich in transition metals at room temperature and the Curie point of 280° C. The transfer control layer 6 made of TbFe has the composition rich in rare-earth elements at room temperature and the Curie point of 160° C., and a configuration with exchange coupling to the recording layer 5.

Figure 4:
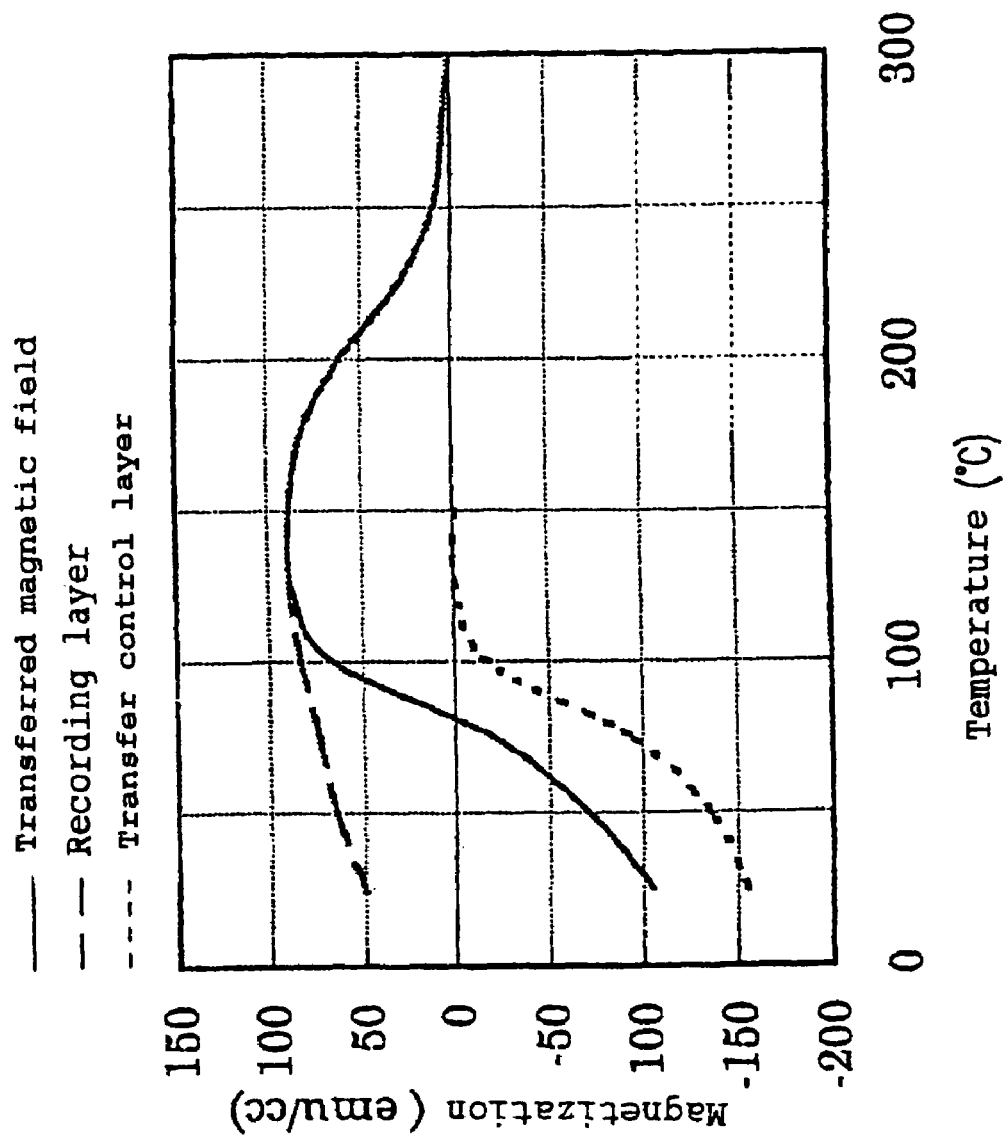
FIG. 4 is a view showing magnetization of the recording layer, magnetization of the transfer control layer, and temperature dependency of a transferred magnetic field, in the first embodiment of the present invention.

FIG. 4 shows temperature dependency of magnetization of such recording layer 5 and transfer control layer 6. In the FIG. 4, a broken line shows temperature dependency of magnetization of the recording layer 5 and a dotted line shows temperature dependency of magnetization of the transfer control layer 6. Besides, a solid line shows temperature dependency of magnitude of magnetization, i.e., the magnetic field for transfer (transferred magnetic field,) yielded by adding magnetization of both the recording layer 5 and the transfer control layer 6 in a layered condition.

By this, it is known that the magnitude of transferred magnetic field, i.e., the magnitude of the added magnetization of the recording layer 5 and the transfer control layer 6 which have been layered, abruptly increases at around 80° C. Therefore, in the case where the recording magnetic domain 13 of the recording layer 5 is transferred to the reproduction layer 3 by the static magnetic field, the magnitude of the static magnetic field abruptly changes according to the temperature to make detection of the reproducing signal easy.

Figure 5:
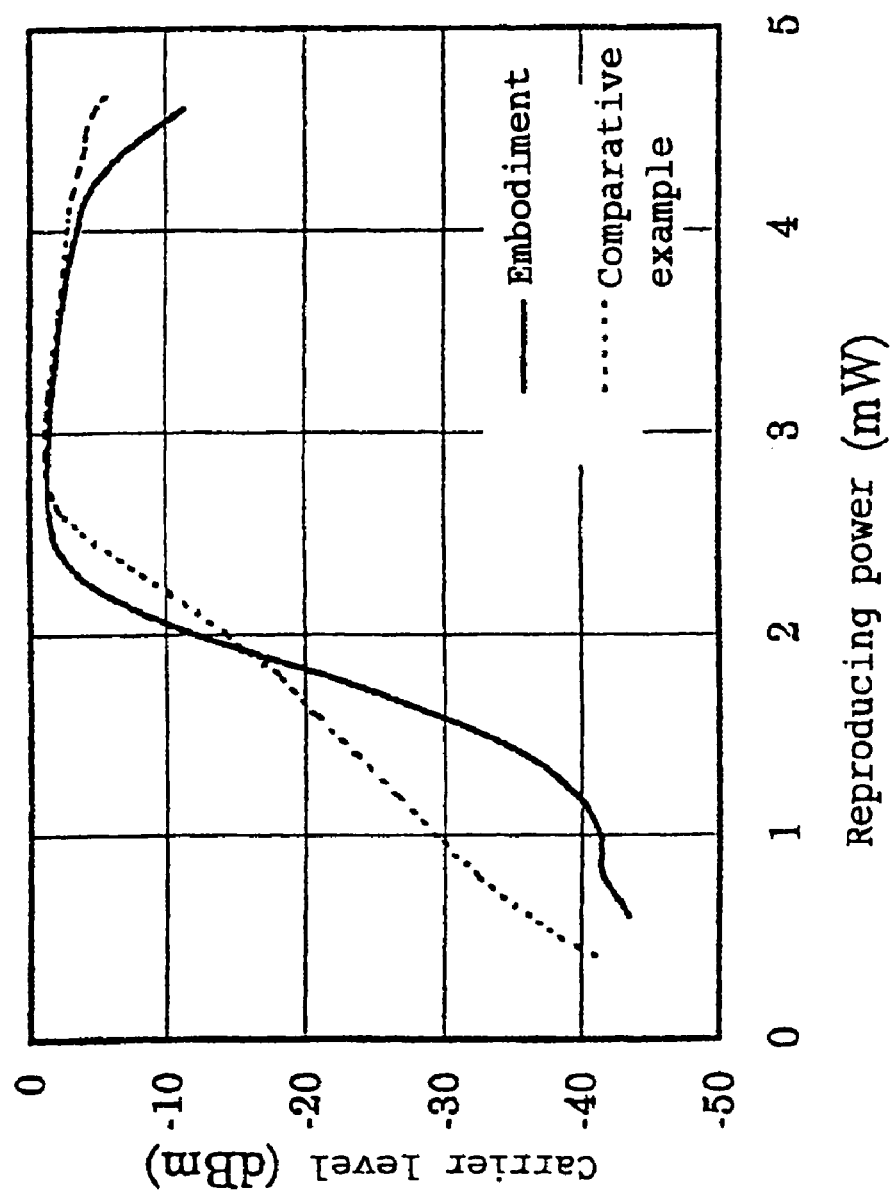
FIG. 5 is a view showing dependency of carrier level of a reproduced signal on a reproducing power, in the first embodiment of the present invention.

FIG. 5 shows characteristics of the carrier level of a signal in contrast to the reproducing power at room temperature of 25° C. This signal is actually read from the signal recorded by the laser pulsed magnetic field modulation recording with a 30% pulse width of the radiation laser, applying a magnetic field of the recording modulation magnetic field of 300 Oe to the magneto-optical recording medium 100 of the present embodiment. In this experiment, NA of an objective lens of an optical head was 0.55 and a wavelength of a laser light source was 680 nm. A linear velocity of the rotating magneto-optical recording medium was 3.5 m/s, recording power was 8 to 9 mW, and a modulation frequency of the recording magnetic field is set to adjust a mark length to 0.47 μm for recording. For comparison, FIG. 5 shows characteristics of the reproducing signal of the magneto-optical recording medium, which uses the conventional magnetically induced super resolution without use of the transfer control layer 6 of the present invention, against the reproducing power (the condition of measurement is the same as the above described.).

In the magneto-optical recording medium of conventional configuration, the magnitude of magnetization of the recording layer increases moderately according to the temperature and the reproduction layer changes moderately from the in-plane magnetized film to the perpendicular magnetized film. Therefore, as shown in the FIG. 5 as a comparative example (the dotted line) the signal of −30 dB or stronger was transferred according to the maximum value of the carrier level even by a 1.0 mW reproducing power. The carrier level to be transferred gradually increases according to the temperature rise in accordance with increase in the reproducing power. As the result, in the conventional configuration, a critical temperature between the region to be masked by the reproduction layer and the region to be transferred in the magnetic domain of the recording layer is unclear and the change of the ambient temperature causes that the temperature range of the region to be subjected to the surface masking may become narrow and even a small laser power may transfer the recording magnetic domain of the recording layer. Therefore, the conventional configuration lacking the transfer control layer like the present invention causes that magnetically induced super resolution action becomes unstable and the reproduced signal deteriorates.

In contrast to this, concerning the change of the carrier level according to the reproducing power of the magneto-optical recording medium 100 of the present embodiment, the signal of almost recording magnetic domain of recording layer 5 is not transferred until 1.1 mW of the reproducing power and the carrier level abruptly increased starting around 1.2 mW of the carrier level. This is because of the following reasons.

In the magneto-optical recording medium 100 of the present embodiment, as shown in the FIG. 4, the recording magnetic domain of the recording layer 5 at low temperature is not transferred in case of a low reproducing power. Because the recording layer 5 and the transfer control layer 6, which have different direction of magnetization, are combined. However, in the high temperature region where the recording magnetic domain of the recording layer 3 is transferred, the transfer control layer 6 reaches the Curie point or higher and thus, transfer and reproduction is carried out by magnetization from only the recording layer 3 side. Particularly, around the critical temperature where the signal is transferred to the reproduction layer 3, the abrupt change of magnetization is yielded by extinction of the magnetization of the transfer control layer 6 and increase in the magnetization of the recording layer 5. Thus, detection of the transferring signal becomes possible without any effect of the ambient temperature.

As described above, use of the magneto-optical recording medium 100 of the present embodiment allows abrupt change of characteristics of magnetization transferred by the magnetostatic field according to the reproducing power in case of magnetically induced super resolution using reproduction layer 3 of the in-plane magnetized film. Thus, the magneto-optical recording medium having a large reproducing power margin in comparison with the change of the ambient temperature can be realized. In addition, the reproduced signal deteriorated by cross talk in the mask region of magnetically induced super resolution was reduced. On these advantages, the magneto-optical recording medium capable of excellent high density recording and reproducing and a good information reproducing method can be provided.

According to the configuration of the magneto-optical recording medium 100 of the present embodiment, the configuration, in which the transfer control layer 6 has magnetic characteristics opposite to the direction of the recording layer 5, allows decreasing the effect of a floating magnetic field due to the recording layer 5 at a peripheral part of the record mark in recording in the recording layer by the magnetic characteristics of opposite direction. By this, the recording magnetic field characteristics can be improved.

(Embodiment 2)

Next, a second embodiment of the present invention will be described below.

The magneto-optical recording medium of the present embodiment has the same configuration as that of the FIG. 1 shown in the first embodiment and specifically, has the recording film structure in which the dielectric layer 2 for enhancing is formed on an optical disk substrate 1 made from a plastic material and the reproduction layer 3, intermediate layer 4, recording layer 5, and transfer control layer 6 are sequentially layered. Further, protecting layer 7 and overcoat layer 8 are formed thereon. In addition, a heat controlling and absorbing layer such as Al and Cu having a large heat conductivity may be added to the top on the transfer control layer 6 through the dielectric layer.

The recording film structure composed of respective layers 3 to 6 realizes the recording and reproducing method to increase recording density by using the CAD system as same as that of the first embodiment, and has the multilayer structure magnetically coupled to increase the reproducing signal magnitude in case of reproduction of the high density record with the diameter of the domain equal to or below 0.5 μm at the time of reproduction. In addition, the present embodiment has a configuration using the GdDyFe magnetic film as the intermediate film 4, forms a surface mask in the low temperature region by exchange coupling between the reproduction layer 3 and the intermediate layer 4, and transfers and reproduces the recording magnetic domain 13 of the recording layer 5 only in the case where the intermediate layer 4 becomes a high temperature, that is the Curie temperature or higher. The characteristic of the reproduction layer 3 and the principle of operation at the time of reproduction is almost same as that of the first embodiment and detailed description will be omitted herewith.

The magneto-optical recording medium of the present embodiment will be described below with reference to the FIG. 1. The optical disk substrate 1 consisting of a polyolefin and having a pre-pit serpentined for the tracking guide of the light spot is used, and thereon, A ZnS film with 80 nm thickness is formed by RF sputtering as the dielectric layer 2 for enhancing. The recording film structure thereon has a form made by DC sputtering of the 30 nm GdFeCo reproduction layer 3, 25 nm GdDyFe intermediate layer 4, 50 nm TbFeCoCr recording layer 5, and 35 nm DyFeCo transfer control layer 6, respectively sequentially. Further thereon, a $ZnS-SiO_2$ protecting layer 7 is formed to make a thickness of 10 nm by RF sputtering and an AlTi heat sink layer with a thickness of 40 nm is formed by DC sputtering. Besides, thereto, an epoxy-based ultraviolet light-hardening resin is applied by spin coat to harden finally resulting in the overcoat layer 8.

In the recording film of the present embodiment, the GdFeCo reproduction layer 3 has the composition rich in rare-earth elements at room temperature, the Curie point of 310° C., and the compensation temperature of 280° C. The GdDyFe intermediate layer 4 has the composition rich in transition metals having the magnetic anisotropy in the direction of film surface and the Curie point of 140° C. Furthermore, the TbFeCoCr recording layer 5 put through the intermediate layer 4 has the composition rich in transition metals at room temperature and the Curie point of 270° C. The transfer control layer 6 consisting of DyFeCo has the composition rich in rare-earth elements at room temperature, the Curie point of 200° C., the compensation temperature of 110° C., and configuration by the exchange coupling to the recording layer 5.

Figure 6:
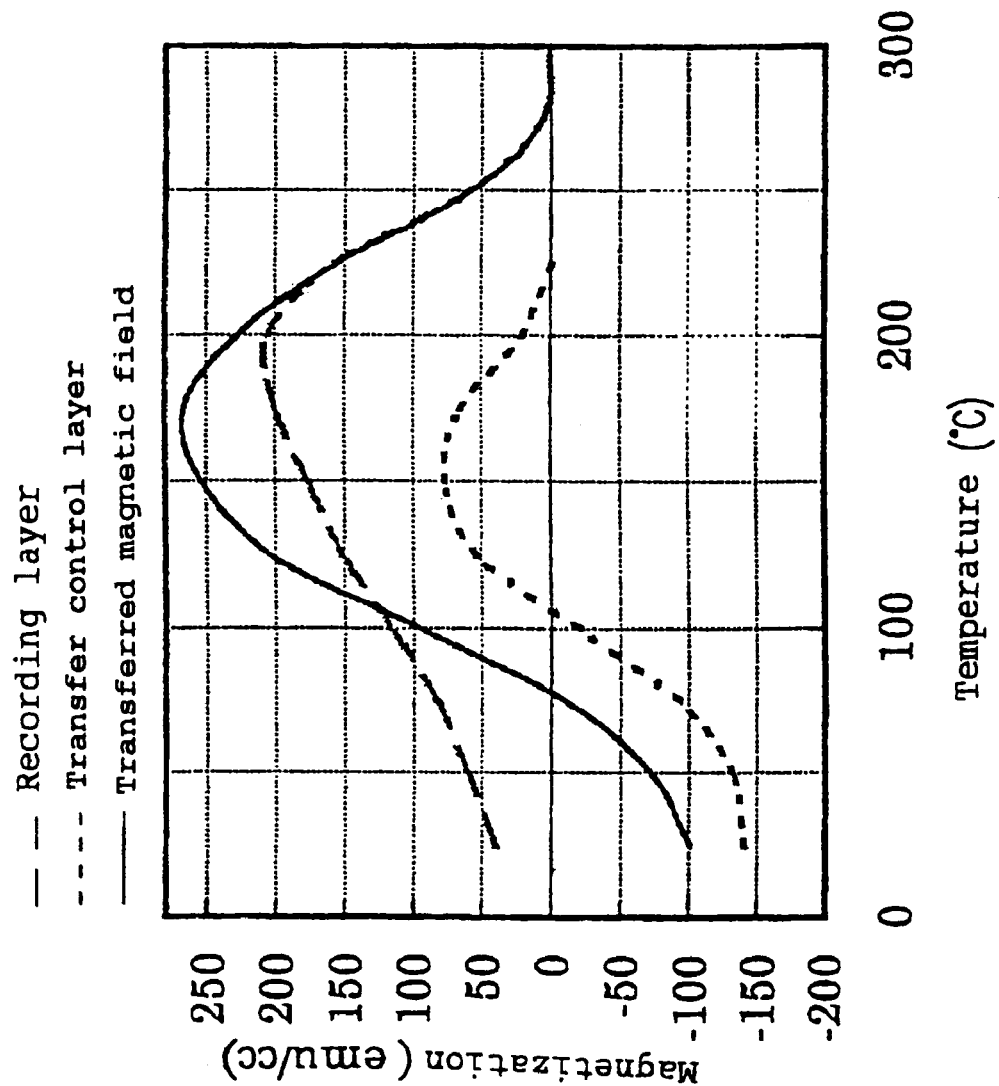
FIG. 6 is a view showing magnetization of a recording layer, magnetization of a transfer control layer, and temperature dependency of a transferred magnetic field, in a second embodiment of the present invention.

FIG. 6 shows temperature dependency of magnetization of such the recording layer 5 and the transfer control layer 6. In the FIG. 6, the broken line shows temperature dependency of magnetization of the recording layer 5 and the dotted line shows temperature dependency of magnetization of the transfer control layer 6. Besides, the solid line shows temperature dependency of magnitude of magnetization, i.e., the magnetic field for transfer (transferred magnetic field,) yielded by adding magnetization of both the recording layer 5 and the transfer control layer 6 in a layered condition.

As shown in the figure, magnetization of the recording layer 5 and magnetization of the transfer control layer 6 are opposite each other in the direction of magnetization in a temperature up to about 110° C., a compensation temperature, of the transfer control layer 6 and therefore, both the layers cancel each other out. However, in a temperature above the compensation temperature, the transfer control layer 6 has the composition rich in rare-earth elements, the direction of magnetization thereof coincides with the direction of magnetization of the recording layer 5, and the transferred magnetic field abruptly increases, because magnetization of the transfer control layer 6 is added to magnetization of the recording layer 5.

At the moment, if the intermediate layer 4 has been set to the Curie point or higher, extinction of magnetism occurs to make stable transfer possible.

In addition, the intermediate layer 4 is the surface magnetizing film below the Curie point to support a surface magnetization component of magnetization of the reproduction layer 3 and thus, the masking characteristic is improved. As a result, the reproduced signal can be detected with a short mark (recording magnetic domain).

Resultingly, concerning the change of carrier level according to the reproducing power of the magneto-optical recording medium of the present embodiment, as same as that of the first embodiment, the signal of the recording magnetic domain of the recording layer 5 is not almost transferred until the recording power of 1.2 mW and the carrier level abruptly increases starting from about 1.4 mW of the recording power.

In the present embodiment, the configuration using the transfer control layer 6 allows decreasing the transferred magnetic field in the low temperature. In a temperature range 80° C. and lower which includes the temperature (in other words, critical temperature) in which magnetization of the recording layer 5 and magnetization of the transfer control layer 6 show opposite direction and coincide their magnitude each other, the magnitude of magnetization (transferred magnetic field) yielded by addition of the recording layer 5 and magnetization of the transfer control layer 6 that have been layered is 100 emu/cc (refer to the FIG. 6.) Therefore, the transferred magnetic field is almost canceled around the critical temperature.

In the present embodiment, the temperature is around the room temperature the added magnetization (transferred magnetic field) has relatively increased in an opposite direction. However, in the temperature range around the room temperature near there, the in-plane magnetic anisotropy of the reproduction layer increases to have a sufficient masking characteristic and thus, the characteristic of the opposite direction of the added magnetization is not a problem.

Consequently, according to the configuration of the present embodiment, in the low temperature region, the recording magnetic domain of the recording layer 5 is not transferred and therefore, the surface masking characteristic of the reproduction layer 3 is improved. On the other hand, in the high temperature region in which the recording magnetic domain of the recording layer 5 is transferred, the transfer control layer 6 becomes the compensation temperature or higher and therefore, transfer is stably carried out by magnetization from the side of the recording layer 3 and thus reproduction is performed. Resultingly, in the magneto-optical recording medium of the present embodiment, recording and reproducing with domain length of 0.4 μm is possible.

As described above, in the present embodiment, the excellent magneto-optical recording medium, in which the information signal of 0.5 μm or smaller is stably recorded and reproduced, can be realized according to the configuration, in which the recording layer and the transfer control layer are layered, in the CAD system using the magnetically induced super resolution.

(Embodiment 3)

The third embodiment of the present invention will be described below with reference to the drawings.

Figure 7:
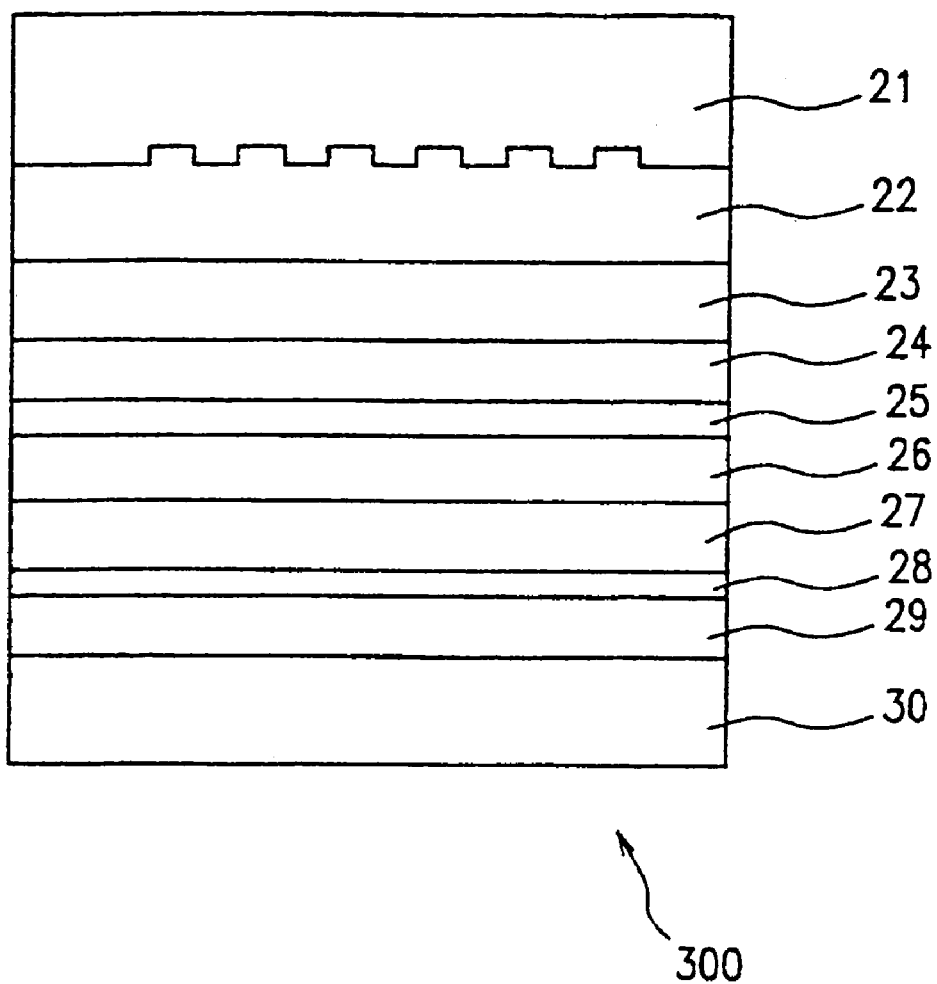
FIG. 7 is a sectional view showing diagrammatically a configuration of a magneto-optical recording medium of the third embodiment of the present invention.

FIG. 7 is a sectional view showing diagrammatically the configuration of the magneto-optical recording medium 300 of the present embodiment.

In this embodiment a reproduction magnetic domain enlarged layer which enlarges reproduction signals at a reproduction layer is called as "domain enlarged layer".

In the FIG. 7, a dielectric layer 22 for enhancing, consisting of SiN, is formed on the optical disk substrate 21 consisting of a poly-carbonate and having a guide groove for the tracking guide of the light spot. Thereon, the recording film structure with five layer structure is made by layering sequentially the GdFeCo domain enlarged layer 23, GdFeCoCr reproduction layer 24, AlN intermediate layer 25, TbFeCo recording layer 26, and DyTbFeCo transfer control layer 27. On such recording film structure, an AlCrN heat shield layer 28, an AlCr heat sink layer 29, and an epoxy-based ultraviolet light-hardening resin overcoat layer 30 are formed.

As forming method for the magneto-optical recording medium 300 of the present embodiment, first, a Si target is subjected to reactive sputtering in an atmosphere of a mixture of argon gas and nitrogen gas using a direct current magnetron sputtering machine to form an SiN film 22 of 80 nm, which is, on a poly-carbonate substrate 21 having the configuration which can record in a land part and a groove part for tracking guide of the light spot. Further, a 20 mm GdFeCo film 23 is formed by sputtering in argon gas using a GdFeCo target followed by forming a 15 nm GdFeCoCr film 24 by sputtering in argon gas by using a GdFeCoCr target. Furthermore, a 25 nm AlN film is formed by the DC sputtering of the Al target in the mixture of argon gas and nitrogen gas. Thereon, 35 nm TbFeCo recording layer 26 and 30 nm DyTbFeCo transfer control layer 27 are layered by using respective targets of TbFeCo and DyTbFeCo, respectively. AlCrN heat shield layer 28 is formed to make a thickness of 20 nm by reactive sputtering in the atmosphere of the mixture of argon gas and nitrogen gas by using AlCr target, and the AlCr target is subjected to the DC sputtering in argon gas to form 50 nm heat sink layer 29. In addition, thereon, a 6 μm epoxy-based UV resin is coated by spin coating to receive ultraviolet light radiation to harden to make an overcoat layer 30 and finally, yield the magneto-optical recording medium 300 of the present embodiment.

The recording film structure of the magneto-optical recording medium 300, composed of respective layers 23 to 27, of the present embodiment, allows achieving a method for increasing the recording density through the multilayer film structure by using magnetic domain enlargement using the magnetic domain enlarged layer 23 of a shrink type, and has the multilayer film structure magnetically coupled to amplify the reproducing signal magnitude in case of the high density recording and reproducing of the domain diameter of 0.4 μm or smaller at the time of reproduction.

Figure 8:
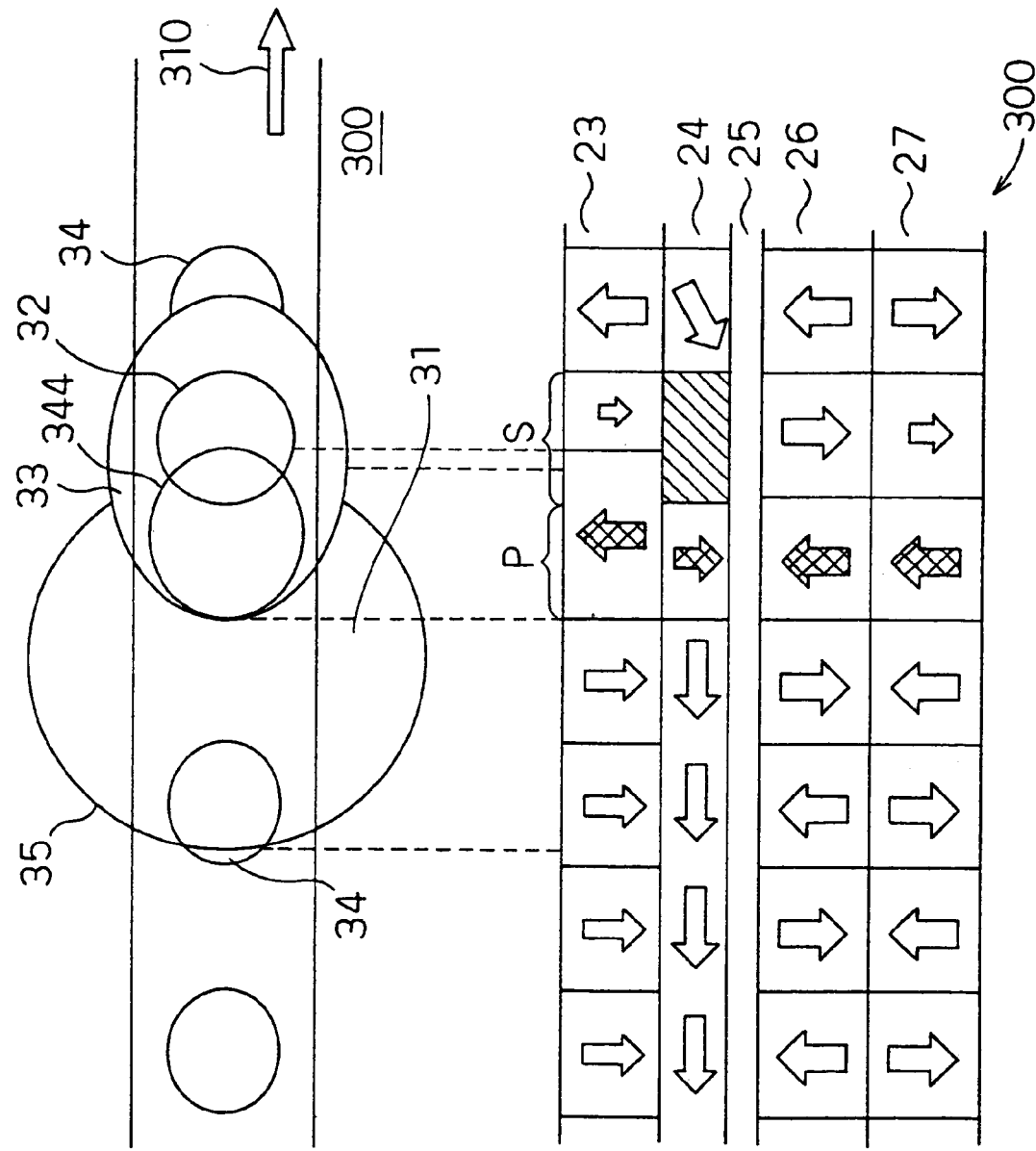
FIG. 8(A), 8(B) are views illustrating a reproducing operation of the magneto-optical recording medium in the third embodiment of the present invention.

FIG. 8 shows a configuration figure in the reproducing operation of the magneto-optical recording medium 300 using the magnetic domain enlarged layer 23 of the shrink type, which is a system of the magnetic domain enlargement of the present embodiment; (a) is a plan view showing a part of a track of the magneto-optical recording medium 300, and (b) is a sectional view showing the structure of (particularly direction of magnetization) a recording film of the magneto-optical recording medium 300. The arrow 310 shown in the FIG. 8(A) is a movement direction along with the track of the magneto-optical recording medium 300. Arrows illustrated in respective layers 23, 24, 26, and 27 of the FIG. 8(B) show directions of magnetization in respective positions.

The principle of reproduction according to the present embodiment will be briefly described below with reference to the FIG. 8.

As shown in the FIG. 8(B), the structure of recording film according to the magneto-optical recording medium 300 of the present embodiment is the five layer structure composed of the domain enlarged layer 23, reproduction layer 24, intermediate layer 25, recording layer 26, and transfer control layer 27. In the FIG. 8(A), 35 is a reproducing laser light spot, 31 and 32 are masking regions (specifically, 31 is a low temperature region and 32 is a high temperature region) and 33 is a reproducible temperature region. The recording magnetic domain 34 is recorded in the recording layer 26. Where, the following relationships are necessary: the recording layer 26 and the transfer control layer 27 have opposite magnetization at room temperature, the reproducible temperature region 33 is in a temperature of the Curie point or higher of the transfer control layer 27, and the Curie point of the recording layer 26 is higher than the temperature of the reproducible temperature region 33.

In the structure of recording film according to the magneto-optical recording medium 300 of the present embodiment, GdFeCo domain enlarged layer 23 has a composition rich in rare-earth elements at room temperature, the Curie point of 310° C., and the compensation temperature of 100° C. The reproduction layer 24 has the composition rich in transition metals of the in-plane magnetized film at room temperature and is made from GdFeCoCr with the Curie point of 190° C. The AlN intermediate layer 25 is a film to block the exchange coupling, and TbFeCo recording layer 26, which is layered through the intermediate layer 25, has the composition rich in rare-earth elements at room temperature, the Curie point of 300° C., and the compensation temperature of 110° C. The transfer control layer 27 made of DyTbFeCo has the composition rich in transition metals at room temperature, the Curie point of 140° C., and a configuration with exchange coupling to the recording layer 26.

Figure 10:
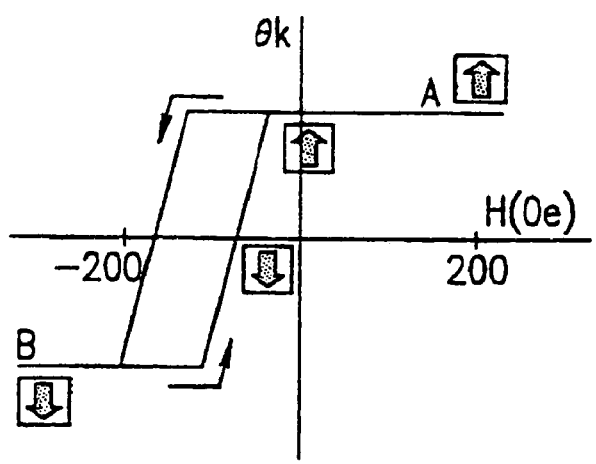
FIG. 10(A) to FIG. 10(C) are views showing the magnetic property (the Kerr hysteresis loop and direction of magnetization) of a single layer condition of a GdFeCo domain enlarged layer used in the third embodiment of the present invention; in different temperatures.
Figure 10:
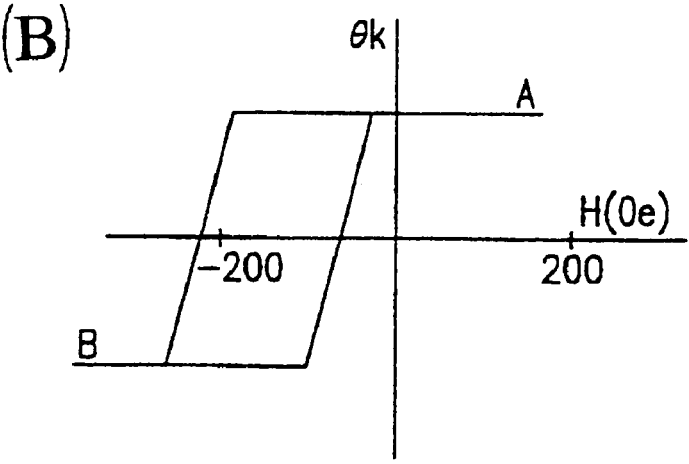
Figure 10:
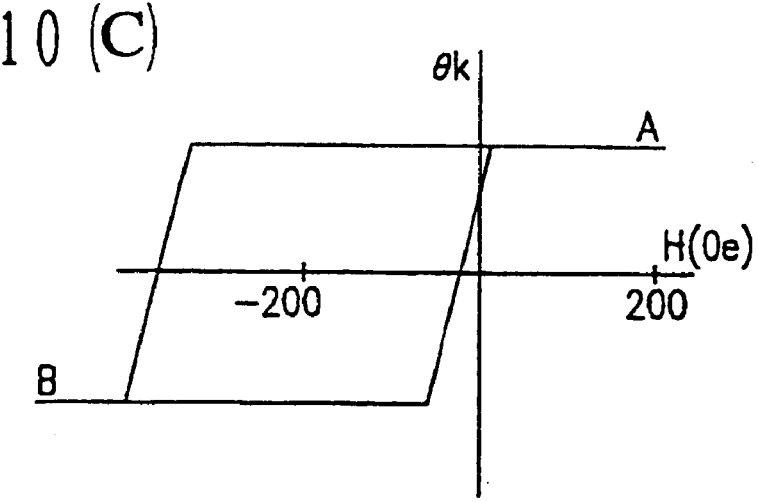

FIGS. 10(A) to 10(C) are figures showing the magnetic property (the Kerr hysteresis loop and direction of magnetization) of a single layer condition of the domain-enlarged layer 23 in the magneto-optical recording medium 300 of the present embodiment in different temperatures. Specifically, FIG. 10(A) is a graph in 50° C., (B) is in 110° C., and (C) is in 160° C., respectively.

In the Kerr hysteresis loop of the FIG. 10(A) as an example, when the magnetic field H is applied to the domain enlarged layer 23 from a positive side to a negative side, the magnetizing condition of A in the figure changes to the opposite magnetizing condition of B in magnetic field of about −180 Oe. In addition, when the magnetic field H is applied to the domain enlarged layer 23 from the magnetizing condition of B toward the positive side, the domain enlarged layer 23 returns to the magnetizing condition of A around about −70 Oe, which is the magnetic field in the negative side than zero. As described above, in the Kerr hysteresis loop of the domain enlarged layer 23 contained in the magneto-optical recording medium 300 of the present embodiment, as shown in the FIGS. 10(A) to 10(C), the magnetic field applied is shifted to the negative direction. Particularly, in case of the low temperature shown in FIG. 10(A) or FIG. 10(B), a characteristic, in which the direction of magnetization is arranged to one direction, is observed in case of no external magnetic field to result in masking by the shrinking action through magnetization in one direction.

The functions of the reproduction layer 24 are same as those of the first and second embodiment.

Therefore, in the low temperature region 31 in the recording light spot 35, the reproduction layer 24 has magnetic anisotropy in the direction of the surface of the film and thus, the recording magnetic domain 34 of the recording layer 26 is not transferred to the domain enlarged layer 23 to be masked by the shrinking action of the above described domain enlarged layer 23.

In the high temperature region 32 in the recording light spot 35, the reproduction layer 24 reaches a temperature equal to or higher than the Curie point and therefore, the recording magnetic domain 34 of the recording layer 26 is merely slightly transferred to the domain enlarged layer 23.

By this reason, the recording magnetic domain 34 is transferred, from only the middle temperature region 33 in the recording light spot 35, to and formed in the domain enlarged layer 23 through the reproduction layer 24. Then, the reproduction layer 24 reaches a temperature equal to or higher than the Curie point and therefore, a domain wall of the domain enlarged layer 23 is easy to move to the direction of the high temperature region 32 and a region 344 larger than the recording magnetic domain 34 is transferred and formed in the domain enlarged layer 23.

In other words, the part S of the domain enlarged layer 23 formed in the part (hatched part) in which magnetization extinguished in the reproduction layer 24 is largely influenced by the part P of the domain enlarged layer 23 formed in the part which is vertically magnetized by the middle temperature of the reproduction layer 24 in comparison with the influence by the recording layer 26. Thus, the domain enlarges toward the direction thereof.

As the result, the transfer signal of the recording magnetic domain 34 is reproduced as the reproduced region 344 enlarged by domain wall movement. In the reproducing method of the shrink type of the present embodiment, reproduction is carried out by the laser power of 2.5 mW larger than a normal one to satisfy the above described reproducing operation.

Figure 9:
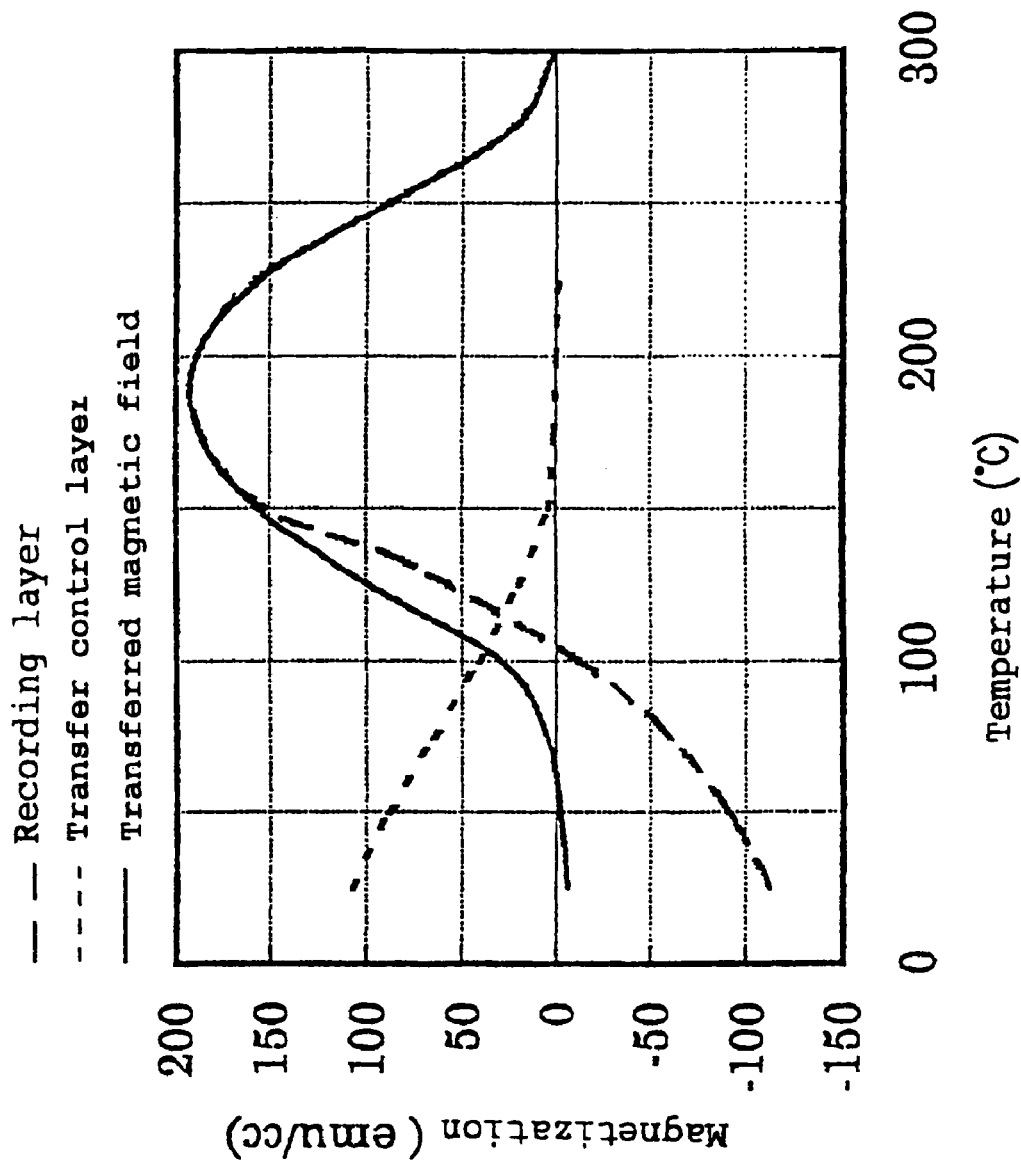
FIG. 9 is a view showing magnetization of a recording layer, magnetization of a transfer control layer, and temperature dependency of a transferred magnetic field, in the third embodiment of the present invention.

FIG. 9 shows temperature dependency of magnetization of the recording layer 26 and the transfer control layer 27 contained in such magneto-optical recording medium 300 of the present embodiment. In the FIG. 9, the broken line shows temperature dependency of magnetization of the recording layer 26 and the dotted line shows temperature dependency of magnetization of the transfer control layer 27. Besides, the solid line shows temperature dependency of magnitude of magnetization, i.e., the magnetic field for transfer (transferred magnetic field) yielded by adding magnetization of both the recording layer 26 and the transfer control layer 27 in the layered condition.

In the structure of recording film of the present embodiment, TbFeCo recording layer 26 has the composition rich in rare-earth elements at room temperature, the Curie point of 300° C., and the compensation temperature of 110° C. The transfer control layer 27 made of DyTbFeCo has the composition rich in transition metals at room temperature, the Curie point of 140° C., and a configuration with exchange coupling to the recording layer 26. Concerning the magnitude of magnetization (transferred magnetic field) yielded by addition of the recording layer 26 and the transfer control layer 27 which are layered, in a temperature range 100° C. or lower, magnetization of the recording layer and magnetization of the transfer control layer show opposite direction each other and therefore magnetization of both layers cancels each other. On the other hand, in a temperature over about 100° C., the direction of magnetization of both layers coincide and therefore, the magnitude of magnetization (transferred magnetic field) yielded by addition abruptly increases. Therefore, when transfer to the domain enlarged layer 23 is carried out by using magnetic coupling through the intermediate layer 25, the magnitude of magnetic interaction abruptly changes according to the temperature in the condition in which the reproduction layer 24, the recording layer 26, and the transfer control layer 27 are layered, and the recording magnetic domain 34 is easily formed by transfer in the middle temperature region 33 in the recording light spot 35. In the domain enlarged layer 23, the recording magnetic domain is formed by transfer in the enlarged status (refer to a reference numeral 344 in the FIG. 8).

Actually, concerning the carrier level, which changes according to the reproducing power, of the signal generated by reproducing the signal, with a 0.27 μm mark length, which was recorded by the laser pulsed magnetic field modulation recording with a 40% pulse width, applying a magnetic field of the recording magnetic field of 3000 e to the magneto-optical recording medium 300 of the present embodiment, the carrier level increases abruptly by the reproducing power of 1.0 mW or larger, as same as that of the first embodiment. Besides, in the magneto-optical recording medium 300 of the present embodiment, as shown in the graph of characteristic for a signal amplitude of the reproduced signal according to the mark length (the size of recording magnetic domain) of the FIG. 11, deduction of the signal amplitude is small even in case that the mark length becomes small.

Figure 11:
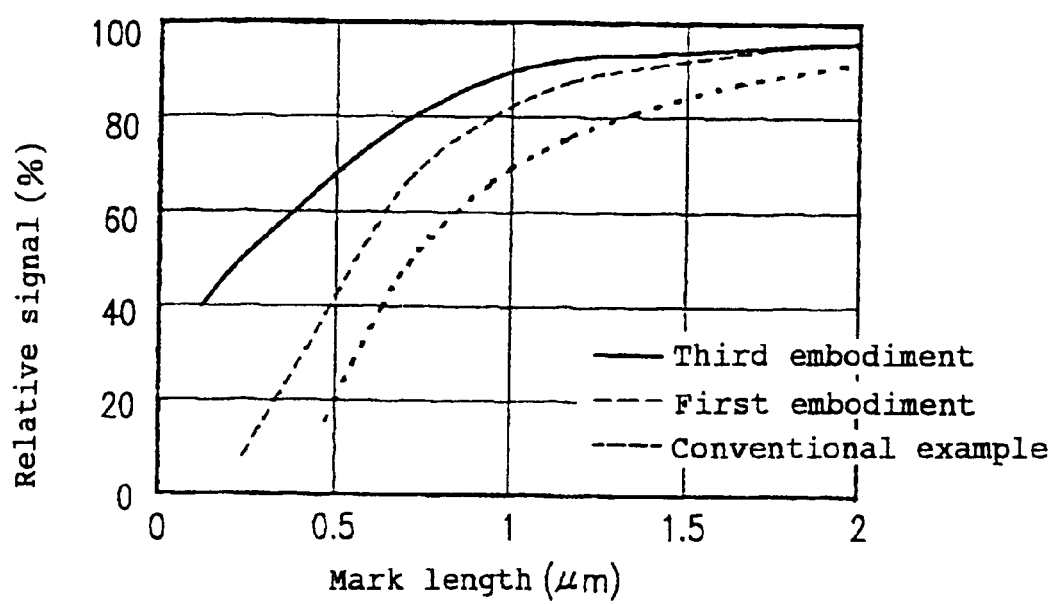
FIG. 11 is a view showing dependency of a signal amplification of a replay signal on a mark length, in the third embodiment of the present invention.
Figure 12:
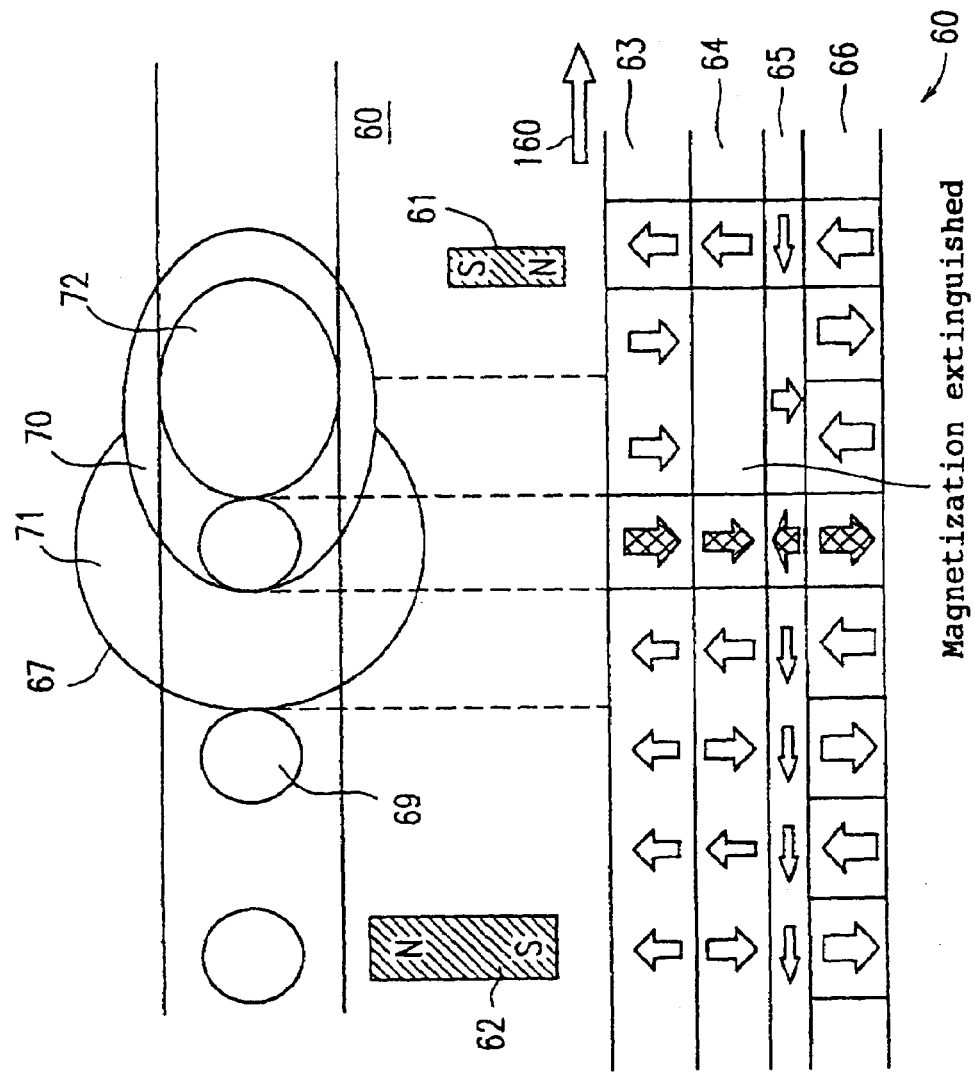
FIG. 12(A), 12(B) are views illustrating a reproducing operation of a magneto-optical recording medium of a conventional double mask system.
Figure 13:
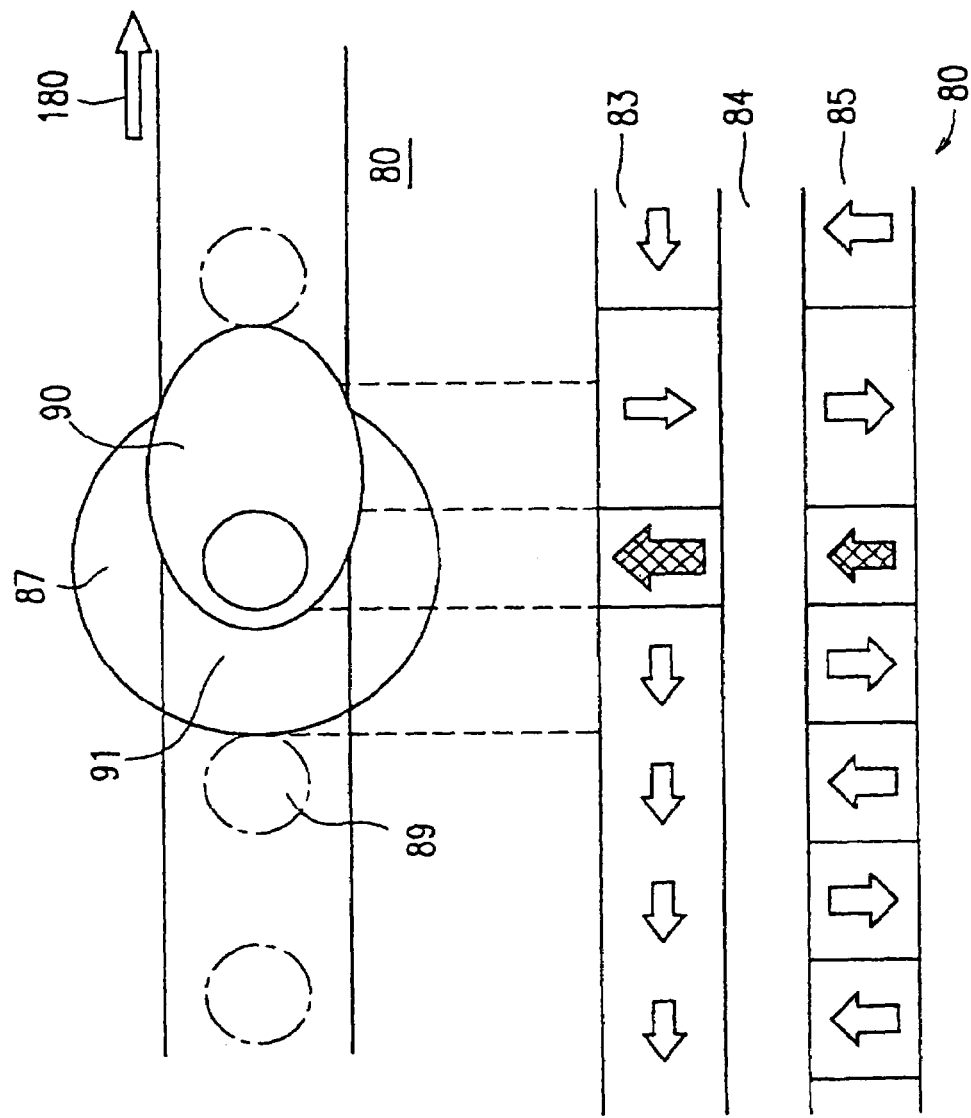
FIG. 13(A), 13(B) are views illustrating the reproducing operation of the magneto-optical recording medium of another conventional CAD type.

FIG. 11 is a view made by plotting a normalized signal amplification (a normalized signal) which is standardized with amplitude in the mark length of 3 μm, to the mark length. Thus, in the configuration of the present embodiment, the amplitude above 50% of the amplitude level in the mark length of 3 μm can be obtained even below the mark length of 0.3 μm. Therefore, according to the present embodiment, even in a short recording magnetic domain 34, it is observed that the recording magnetic domain 34 is reproduced by forming as the domain 344 enlarged in transfer. For comparison, the FIG. 11 shows data also obtained from the magneto-optical recording medium of the conventional art and the magneto-optical recording medium of the first embodiment of the present invention.

As described above, using the magneto-optical recording medium 300 of the present embodiment allows abrupt change of the transfer characteristics according to the reproducing power even in case of use of the magnetic domain enlarged layer 23 of the shrink type, and the magneto-optical recording medium providing a large recording power margin according to the change of the ambient temperature can be achieved.

In addition, it is possible to reduce cross talk on the basis of enlargement of transfer magnetic domain and the mask properties, and it becomes possible to provide the magneto-optical recording medium allowing excellent recording and reproducing and a good information reproducing method even in case of recording with the high density below the mark length of 0.3 μm.

In the recording and reproducing method for the magneto-optical recording medium of the respective embodiments of the present invention, the signal (record signal) is detected by using a magneto-optic record reproducing device by a configuration allowing reproducing by the reproducing power higher than the normal one for the magneto-optical recording medium of the present invention as described above.

In the magneto-optic record reproducing device of such magneto-optical recording medium, recording, reproducing, and deleting of information is executed by the laser light. In reproducing the signal in a part of regions in the reproducing laser light spot radiated to the magneto-optical recording medium, the magnitude of magnetization of the recording layer and the magnitude of magnetization of the transfer control layer in the opposite direction coincide each other (becoming the temperature, i.e., becoming the critical temperature to cause the coincidence.) In the region having the temperature higher than the critical temperature in which the magnitudes of magnetization coincides each other, the recording magnetic domain of the recording layers are transferred to and reproduced from the reproduction layer having a characteristic to change from the surface direction to the magnetic film in the vertical direction. Thus, the signal from the region smaller than the reproducing-light spot can be reproduced. As a result, the magneto-optic recording and reproducing device and the reproducing method of the excellent magneto-optical recording medium in which controlling the transfer region is easy and the reproducing margin for the change of the ambient temperature due to abrupt change from a low temperature masking region to a high temperature transfer region can be increased.

According to other aspects of the present invention, in the reproducible temperature range near the temperature in which saturation magnetization with addition of the magnetization of the recording layer and the magnetization of the transfer control layer, which have been layered, becomes maximum, the signal (recorded signal) is reproduced by transferring the domain recorded in the recording layer to the reproduction layer, as the configuration in which a magnetic coupling force of the recording layer, the intermediate layer, and the reproduction layer through the reproducing supporting layer increases further than a constricting force of the domain wall of the reproduction layer. At this time, at least a part of the light spot of the magneto-optical recording medium of which temperature rises by the laser light radiated at the time of reproducing the signal carries out the rising process of the temperature to reach the critical temperature being the temperature in which magnetization of the recording layer and magnetization of the transfer control layer are opposite in direction each other but coincide in magnitude. According to this, the signal recorded is transferred only from the temperature range which is possible of signal transfer by magnetic coupling force between the recording layer and reproduction layer in the region in the reproducing-light spot and other than near the critical temperature range as described above, in order to detect as the reproduced signal. Or, when the signal recorded is transferred from only the temperature range which is possible of signal transfer by magnetic coupling force between the recording layer and reproduction layer in the region in a part of the reproducing-light spot and other than near the critical temperature range in which, magnetization of the recording layer and opposite magnetization of the transfer control layer coincide in magnitude each other, the domain transferred may be enlarged (i.e., using the domain transferred) to detect the signal.

As described above, use of the magneto-optical recording medium and reproducing method of the present invention can provide the magneto-optical recording medium capable of excellent high density recording and reproducing and a good information reproducing method, which can achieve the magneto-optical recording medium of which reproducing power margin is large and the transfer characteristics are excellent according to the change of ambient temperature in case of using magnetically induced super resolution using the in-plane magnetized film and also achieve that the reproduced signal deteriorated by cross talk in the mask region of magnetically induced super resolution are reduced.

(II) Next, other respective embodiments of the present invention will be described below with reference to drawings.

(Embodiment 4)

Figure 15:
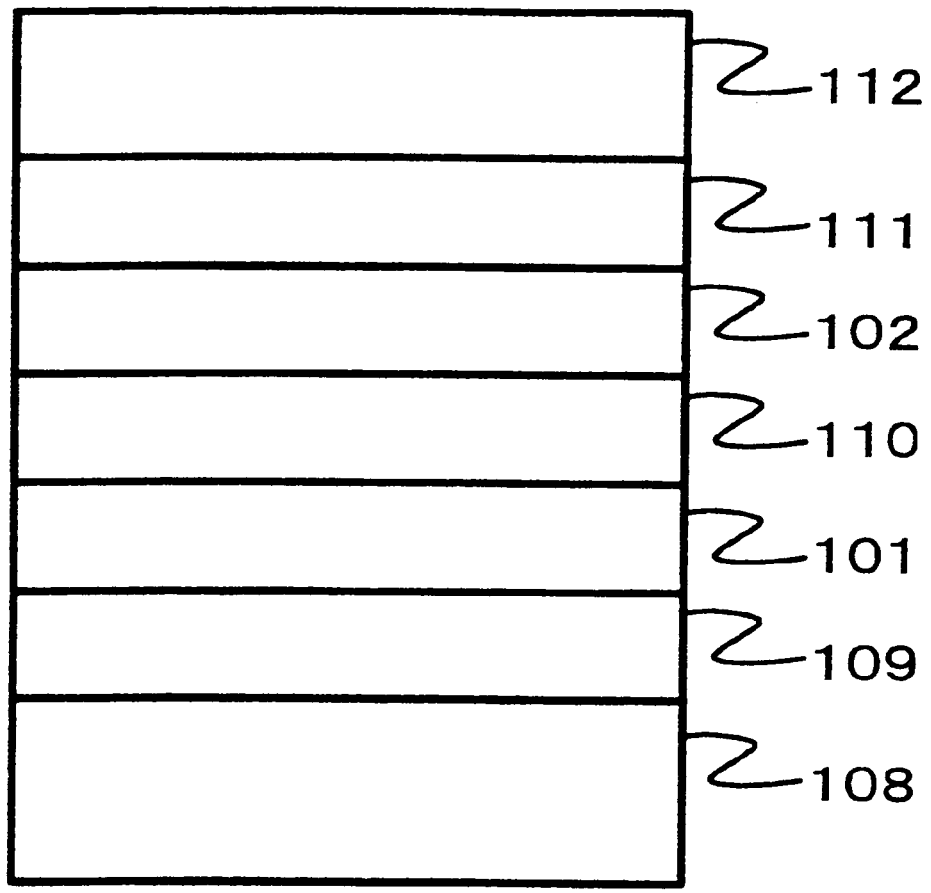
FIG. 15 is a view showing a magneto-optical recording medium according to a fourth embodiment of the present invention.

FIG. 15 is a sectional view of the magneto-optical recording medium according to the fourth embodiment of the present invention. The substrate 108 is a substrate made of poly-carbonate. The substrate made of poly-carbonate is easy to mold and therefore frequently used for the substrate of the magneto-optical recording medium. The substrate 108 has a configuration by the land-groove with the track width of 0.6 µm.

The magneto-optical recording medium according to the present embodiment is configured by forming sequentially the first dielectric layer 109, the first magnetic layer 101, the second dielectric layer 110, the second magnetic layer 102, the third dielectric layer 111, and the overcoat layer 112 on the substrate 108.

Next, the method for preparing the magneto-optical recording medium shown in the FIG. 15.

A thin film on the substrate 108 was formed using a sputtering machine. In the sputtering machine, TbfeCo alloy target, GdFeCo alloy target, and Si target are fitted to separate cathodes, respectively. The substrate 108 made of poly-carbonate is fitted to a substrate holder in the sputtering machine. After the substrate 108 is fitted, inside of the chamber of the sputtering machine was vacuum exhausted with a cryopump up to a high vacuum of $2\times10^{-7}$ Torr or lower.

After exhaust to the high vacuum, Ar gas of $2\times10^{-3}$ Torr and $N_2$ gas of $4\times10^{-3}$ Torr was introduced into the chamber, an electric power of 1 kW was applied, and SiN film, which is the first dielectric layer 109, was formed on the substrate 108 by using the DC sputtering. In the present embodiment, the thickness of the SiN film, which was the first dielectric layer 109, was made 80 nm.

Next, again, the vacuum pressure in the chamber was adjusted to $2\times10^{-7}$ Torr or lower to introduce Ar gas of $5\times10^{-3}$ Torr in the chamber. After introducing Ar gas, a GdFeCo film, which is the first magnetic layer 101, was formed on the first dielectric layer 109. The sputtering was the DC sputtering as same as the first dielectric layer 109.

The film thickness of the first magnetic layer 101 was configured to be thinner to allow passing the light beam. In the present embodiment, the GdFeCo film, which is the first magnetic layer 101, was made 20 nm.

In the present embodiment, the composition of the GdFeCo film, which is the first magnetic layer 101, was Gd30.6Fe61.1 Co8.3 (atomic percentage). The first magnetic layer 101 of the present embodiment was the GdFeCo film having the Curie point of 320° C., changing from the in-plane magnetized film to perpendicular magnetized film in the temperature range near 150° C., and having a composition rich in rare-earth elements.

After forming the first magnetic layer 101, vacuum exhaust was carried out up to $2\times10^{-7}$ Torr again to from the second dielectric layer 110 on the first magnetic layer 101. For the second dielectric layer 110, the SiN film was used as same as the first dielectric layer 109, film forming condition was same as the first dielectric layer 109, Ar gas of $2\times10^{-3}$ Torr and N2 gas of $4\times10^{-3}$ Torr were introduced to inside the chamber, and electric power of 1 kV was applied to form the film.

The thickness of the second dielectric layer 110 considerably influences to magnetostatic coupling of the first magnetic layer 101 with the second magnetic layer 102. A thinner thickness of the second dielectric layer 110 makes a distance between the first magnetic layer 101 with the second magnetic layer 102 short to increase magnetostatic coupling force. Therefore, the thickness of the second dielectric layer 110 is preferably made 100 nm or thinner, and more preferably 30 nm. However, if the thickness of the second dielectric layer 110 is made very thin, the exchange coupling force between the first magnetic layer 101 with the second magnetic layer 102 becomes larger than magnetostatic coupling force. Therefore, it is necessary to make the thickness of the second dielectric layer 110 2 nm or thicker. In the present embodiment, the thickness of the second dielectric layer 110 was made 10 nm. The upper limit of the thickness of the second dielectric layer 110 is preferably 100 nm or thinner and a thickness over this makes magnetostatic coupling force between the first magnetic layer 101 and the second magnetic layer 102 small.

Subsequently, after vacuum exhaust up to $2\times10^{-7}$ Torr again, Ar gas of $5\times10^{-3}$ Torr was introduced in the chamber, a TbFeCo film, which is the second magnetic layer 102, was formed to make 50 nm thickness on the second dielectric layer 110.

In the present embodiment, the composition of the TbFeCo film was Tb22.1Fe71.2Co6.7 (atomic percentage) The TbFeCo film, which was the second magnetic layer 102 of the present embodiment, had the Curie pint of 240° C. and was rich in transition metals.

Next, vacuum exhaust up to $2\times10^{-7}$ Torr was again carried out. After vacuum exhaust, Ar gas of $2\times10^{-3}$ Torr and N2 gas of $4\times10^{-3}$ Torr was introduced into the chamber as same as the first dielectric layer 109. After the introduction, an electric power of 1 kW was applied to the second magnetic layer 102 as same as the first dielectric layer 109 and the second dielectric layer 110 to form the SiN film, which is the third dielectric layer 111.

The thickness of the third dielectric layer 111 should protect the second magnetic layer 102 to such corrosion as oxidization and is preferably 50 nm or thicker. In the present embodiment, the thickness of the third dielectric layer 111 was 80 nm.

The overcoat layer 112 was formed by picking up the magneto-optical recording medium of which respective thin films were formed on the substrate 108 under the above described condition, from the chamber; applying the ultraviolet hardening resin to the surface of the film side of the magneto-optical recording medium by spin coat, and radiation of ultraviolet light. In the present embodiment, the film thickness of the overcoat layer 112 is made 10 μm by viscosity of the ultraviolet hardening resin and controlling rotation of a spin coater.

The reproduction layer of this embodiment has same or similar characteristic to the reproduction layer used in the first embodiment.

On the basis of the above described, a material and a composition, which increase the Curie point, are suitable for the first magnetic layer 101. In the present embodiment, the Curie point of the GdFeCo film being the first magnetic layer 101 is 320° C.

Figure 19:
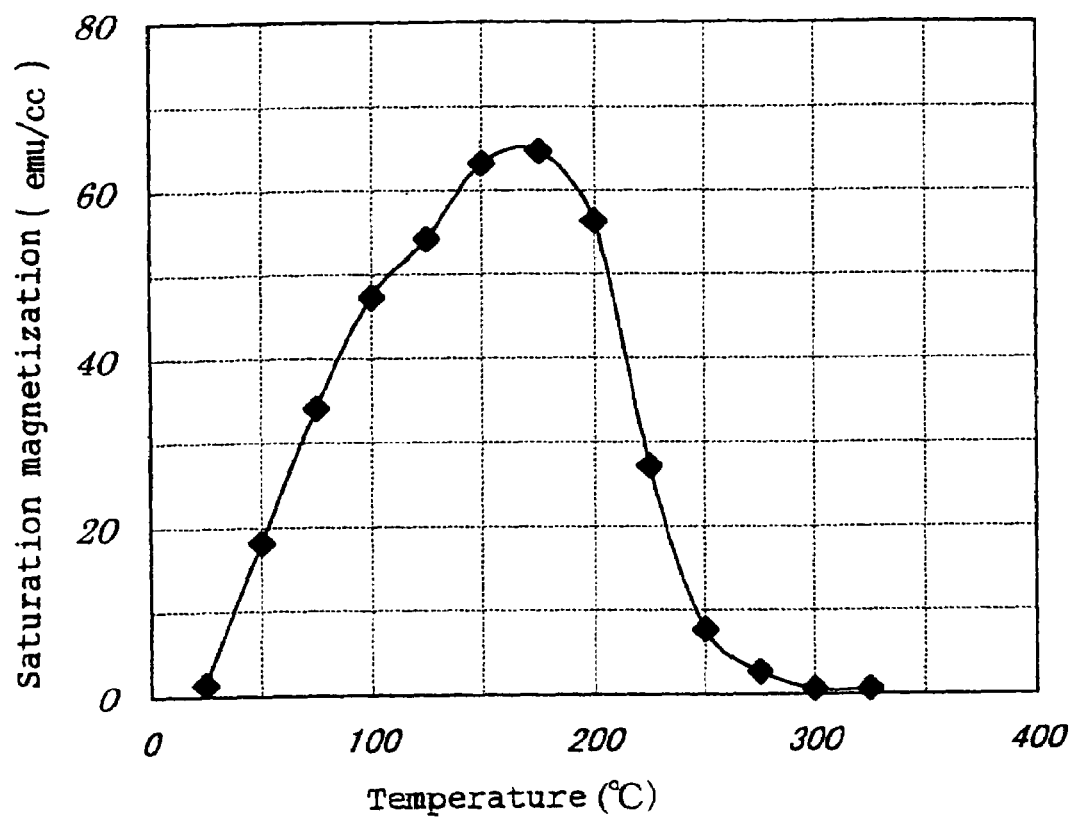
FIG. 19 is a view showing a relationship between a saturation magnetization Ms and the temperature of the second magnetic layer of the magneto-optical recording medium according the present invention.

FIG. 19 is a view showing a relationship between a saturation magnetization Ms and the temperature of the second magnetic layer 102 used in the present embodiment. Magnetostatic coupling force has strong correlation with a magnetic moment and a larger magnetic moment increases magnetostatic coupling force. Magnetic moment proportions to a product of multiplying saturation magnetization by a film thickness and thus, saturation magnetization largely influences on magnetostatic coupling force. The second magnetic layer 102 used in the present embodiment is the TbFeCo film having a transition metal rich composition in which the composition is Tb22.1Fe71.2Co6.7 (atomic percentage) and the Curie point is 240° C.

When the compensation temperature of the second magnetic layer 102 is in near the room temperature, difference between saturation magnetization at room temperature and saturation magnetization in a transfer temperature becomes large to change saturation magnetization according to temperature abruptly. The perpendicular magnetic anisotropy is large and coercivity is also large at room temperature and therefore, the recorded information can be stably kept. The saturation magnetization of the second magnetic layer 102 used at room temperature in the present embodiment is approximately zero. According to temperature rise, the saturation magnetization of the second magnetic layer 102 gradually increases and shows a value of the saturation magnetization capable of satisfactory transfer of information recorded in the second magnetic layer 102 to the first magnetic layer 101 by the signal in a predetermined temperature, i.e., the temperature in transferring the recorded information to the first magnetic layer 101.

The film thickness of the second magnetic layer 102 is preferably 20 nm or thicker to increase the magnetic moment of the second magnetic layer 102 in order to transfer the signal to the first magnetic layer 101. On the other hand, too thick film of the second magnetic layer 102 increases the power of the light beam necessary for temperature rise to cause lowering of recording sensitivity. Therefore, the film thickness of the second magnetic layer 102 is preferably 20 nm or less. In the present embodiment, the film thickness of the second magnetic layer 102 was 50 nm.

Next, the recording and reproducing performance of the magneto-optical recording medium prepared in the present embodiment were tested.

A semiconductor laser of 650 nm wavelength and an objective lens of 0.6 NA were used for the reproducing method according to the present invention. The linear velocity of the medium was 3.5 m/s.

For recording the signal in the magneto-optical recording medium, the laser pulsed magnetic field modulation recording system was applied. A recording power was 9 mW, duty was 50%, the light beam was radiated to the magneto-optical recording medium, and the temperature of the second magnetic layer 102 was raised to the Curie temperature or higher. The signal was recorded by putting a magnetic head in a position close to an opposite surface of the light beam followed by modulating the direction of a magnetic flux generated by the magnetic head in the recording magnetic field of 3500 e.

For reproducing information recorded in the second magnetic layer 102, first, the light beam is radiated to the magneto-optical recording medium to make the region of vertical magnetized film by raising the temperature of the first magnetic layer 101 in a beam spot 107 and then, the temperature of the second magnetic layer 102 is raised to increase the magnetic moment of the second magnetic layer 102 in the beam spot 107.

Subsequently, the signal of the second magnetic layer 102 is transferred to the first magnetic layer 101 by magnetostatic coupling of the first magnetic layer 101 with the second magnetic layer 102.

Finally, the signal is detected from the light beam reflected off the magneto-optical recording medium by magneto-optical effect.

Figure 20:
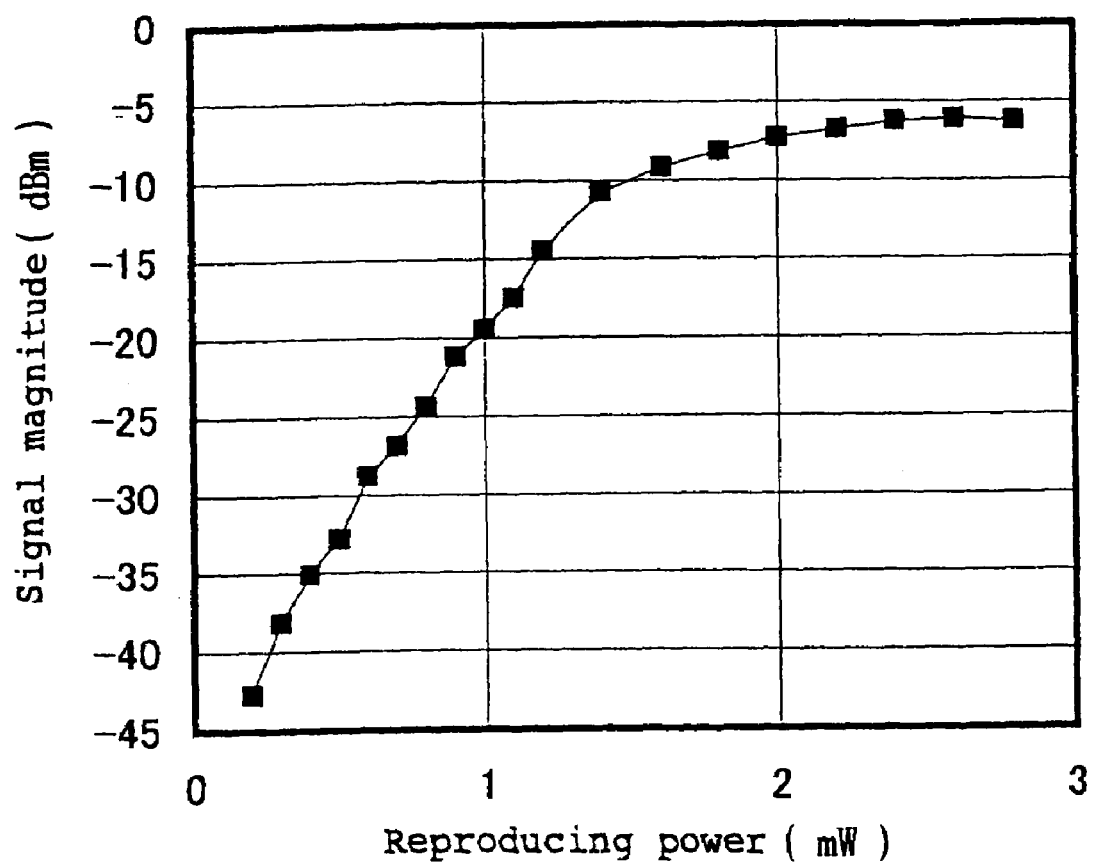
FIG. 20 is a view showing a relationship between a signal quantity and the reproducing power in the magneto-optical recording medium according to the fourth embodiment of the present invention.
Figure 21:
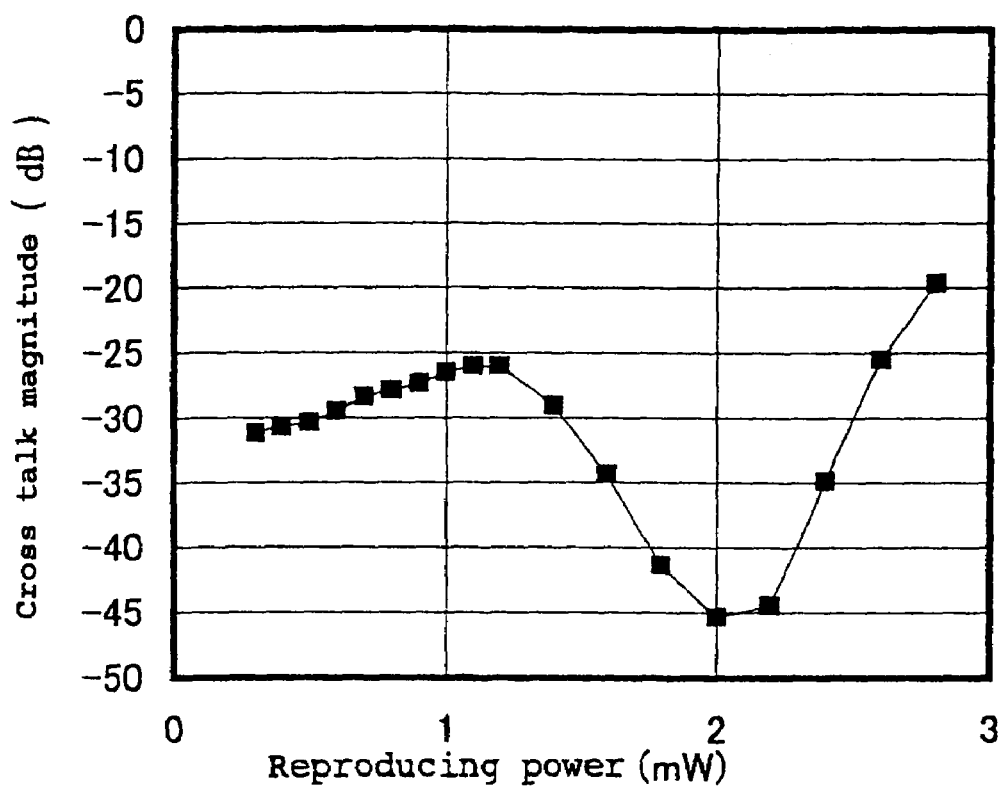
FIG. 21 is a view showing a relationship between a cross talk quantity and the reproducing power in the magneto-optical recording medium according to the fourth embodiment of the present invention.

FIG. 20 is a view showing a relationship between a signal magnitude and the reproducing power in the magneto-optical recording medium according to the present embodiment and FIG. 21 is a view showing a relationship between a cross talk magnitude and the reproducing power in the magneto-optical recording medium according to the present embodiment. Quantity of the signal is the magnitude of 1.88 μm signal. The cross talk magnitude is expressed by the ratio of the signal quantity leaked from an abutting track 106 on a reproductive track 105 to the signal quantity yielded by reproducing the 1.88 μm signal in the reproductive track 105, after recording the 1.88 μm signal in the abutting track 106 of one side.

In a small reproducing power, almost part of the beam spot 107 is the low temperature region and the first magnetic layer 101 is the in-plane magnetized film. Therefore, the rotation of the polarized surface of the light beam reflected off the first magnetic layer 101 is not large, passes through the first magnetic layer 101, and canceled by the rotation of the polarized surface of the light beam reflected off the second magnetic layer 102. Thus, as shown in the FIG. 20, only a small quantity of signal is detected.

Changing the reproducing power to somewhat large the first magnetic layer 101 around the center of the beam spot 107 from the in-plane magnetized film changes slightly to the perpendicular magnetized film. The signal can be detected from the region where the first magnetic layer 101 changed to the perpendicular magnetized film. However, a part, where the first magnetic layer 101 changed to the perpendicular magnetized film, in the beam spot 107 is a narrow region and therefore, has very small signal quantity. In a region far from the center in the beam spot 107, the first magnetic layer 101 is a temperature region where the in-plane magnetized film changes to the perpendicular magnetized film and therefore, rotation of polarized plane of the light beam reflected off the first magnetic layer 101 and rotation of polarized plane of the light beam passed through the first magnetic layer and reflected off the second magnetic layer 102 cancel each other.

Increasing the reproducing power further larger makes a wide region from the center in the beam spot 107 to the high temperature region and changes the first magnetic layer 101 from the in-plane magnetized film changes to the perpendicular magnetized film. In the wide region in the beam spot 107, the first magnetic layer 101 changes to the perpendicular magnetized film.

In the high temperature region in the beam spot 107, the first magnetic layer 101 changes to the perpendicular magnetized film and therefore, rotation of polarized plane of the light beam reflected off the first magnetic layer 101 becomes larger than rotation of polarized plane of the light beam reflected off the first magnetic layer 101 in the temperature region during process of change of the first magnetic layer 101 from the in-plane magnetized film to the perpendicular magnetized film by a small reproducing power. Rotation of polarized plane of the light beam reflected off the first magnetic layer 101 in the beam spot 107 becomes larger than rotation of polarized plane of the light beam reflected off the second magnetic layer 102 to give a higher priority to the rotation of polarized plane of the light beam reflected off the first magnetic layer 101 and therefore, a large signal can be detected.

Larger reproducing power widens the high temperature region in the beam spot 107. Then, the first magnetic layer 101 changes from the in-plane magnetized film to the perpendicular magnetized film resulting in a larger signal in the wider region in the beam spot 107.

As shown in properties of cross talk magnitude, which leaks in from the abutting track 106 of FIG. 21, according to the reproducing power, when the reproducing power is small, namely, when the temperature of inside of the beam spot 107 is near the room temperature, the signal magnitude is small and cross talk magnitude is relatively large. Increase in reproducing power increases the cross talk magnitude. It is known that in a range of the reproducing power (a range of 1.2 to 2.0 mW in the figure,) cross talk from the abutting track 106 has reduced.

In the region, as shown in the FIGS. 20 and 21, of reproducing power where the signal magnitude is large and the cross talk magnitude decreases, the first magnetic layer 101 in the region near the center of the beam spot 107 is vertically magnetized film and the first magnetic layer 101 in the region far from the center of the beam spot 107 is the temperature region during changing from the in-plane magnetized film to the perpendicular magnetized film.

Figure 14:
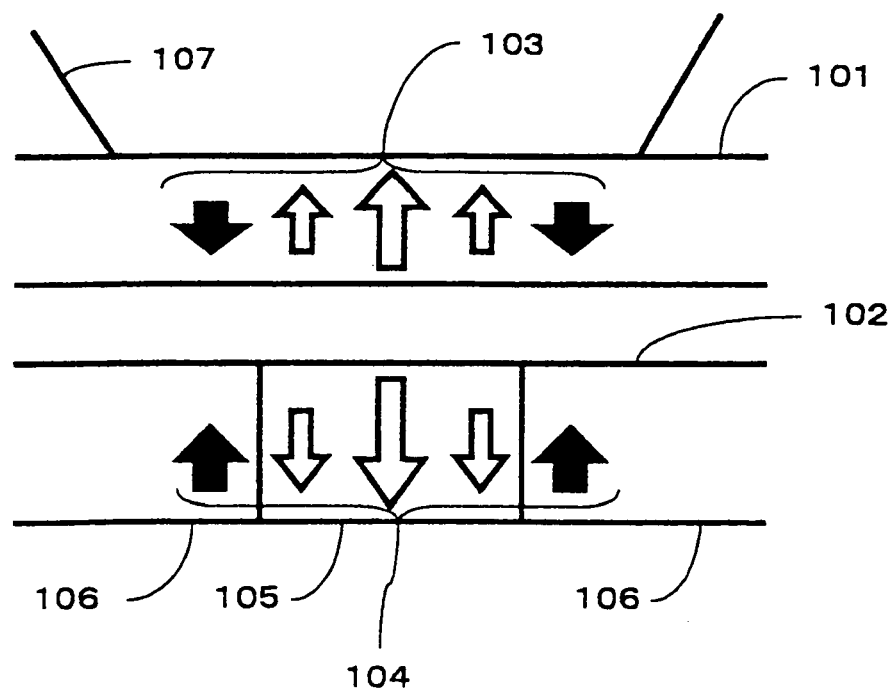
FIG. 14 is a view showing a vertical component of a magnetic moment of the sub-lattice of the transition metal in the magneto-optical recording medium at a reproducing according to the embodiments of the present invention.

As shown in the FIG. 14, in the region far from the center of the beam spot 107, the vertical component 103 of the sub-lattice magnetic moment of transition metal elements of the first magnetic layer becomes smaller than that of the central region. Therefore, the light beam reflected off the first magnetic layer 101 and the light beam passed through the first magnetic layer 101 and reflected off the second magnetic layer 102 are opposite in the rotation direction of polarized plane and approximately equal in magnitude. The abutting track 106 is a region far from the center in the beam spot 107 and relatively low in temperature and therefore, the light beam reflected off the first magnetic layer 101 and the light beam passed through the first magnetic layer 101 and reflected off the second magnetic layer 102 are opposite in the rotation direction of polarized plane and approximately equal in magnitude. Consequently, cross talk from the abutting track 106 greatly reduces.

On the contrary, the region around the center of the beam spot 107, that is, the reproductive track 105 is the high temperature region and the first magnetic layer 101 changes from the in-plane magnetized film to the perpendicular magnetized film, and therefore the large signal can be yielded.

The following is explanation of saturation magnetization of the second magnetic layer 102 in this status. FIG. 19 shows relation between saturation magnetization of the second magnetic layer 102 and temperature. Saturation magnetization at room temperature is very small. Increase in temperature from the room temperature by radiation of the light beam causes increase in saturation magnetization up to a certain temperature.

Radiating the light beam with the reproducing power allowing the large signal magnitude makes saturation magnetization around the center of the beam spot 107 maximum. In the region far from the center of the beam spot 107, the temperature is low than the region around the center and then, saturation magnetization is small than saturation magnetization around the center of the beam spot 107.

As shown in FIGS. 20 and 21, the large signal magnitude yields in the wide range of the reproducing power and the cross talk magnitude becomes −20 dB or smaller. The cross talk magnitude is the signal magnitude from the abutting track 106 and thus, the region far from the center of the beam spot 107 and the low temperature region in the beam spot 107. Then, the signal magnitude according to the cross talk magnitude becomes $\frac{1}{10}$ or smaller to the signal magnitude of the high temperature region in the beam spot 107 and does not cause deterioration of the reproducing signal.

Reproducing method for the magneto-optical recording medium used in the present embodiment will be described below in detail.

The light beam is radiated from the substrate 108 side of the magneto-optical recording medium. In the present embodiment, the wavelength of the light beam is 650 nm and the numerical aperture NA of the objective lens is 0.6.

FIG. 14 shows the first magnetic layer 101, the second magnetic layer 102, and the vertical component 103 of the sub-lattice magnetic moment of transition metal elements of the first magnetic layer and the vertical component 104 of the sub-lattice magnetic moment of transition metal elements of the second magnetic layer, in radiating the light beam with the reproducing power capable of sufficient yield of the signal magnitude. In the configuration of the present embodiment, the first magnetic layer 101 is thin to allow passing light and therefore, a part of light beam radiated from the substrate 108 side passes through the first magnetic layer 101 and reaches the second magnetic layer 102.

As shown in the FIG. 14, in the configuration of the present embodiment, the first magnetic layer 101 is in the process of changing from the in-plane magnetized film to the perpendicular magnetized film in the region far from the center of the beam spot 107. Thus, the vertical component 103 of the sub-lattice magnetic moment of transition metal elements of the first magnetic layer is smaller than that of the central region. When the track width becomes small to detect signal within a beam spot 107 of 1.0 μm range, according to the configuration of a light pick-up, the light beam passes through the first magnetic layer 101 in the abutting track 106 and a part of signals from the second magnetic layer 102 is detected to result in deterioration of the reproduced signal.

However, in the present embodiment, the light beam reflected off the first magnetic layer 101 and the light beam passed through the first magnetic layer 101 and reflected off the second magnetic layer 102 are opposite in the rotation direction of polarized plane and approximately equal in magnitude. The abutting track 106 is a region far from the center in the beam spot 107 and relatively low in temperature and therefore, the light beam reflected off the first magnetic layer 101 and the light beam passed through the first magnetic layer 101 and reflected off the second magnetic layer 102 are opposite in the rotation direction of polarized plane and approximately equal in magnitude. Consequently, cross talk from the abutting track 106 greatly reduces.

On the contrary, the reproductive track 105 around the center of the beam spot 107 is the high temperature region and the first magnetic layer 101 changes from the in-plane magnetized film to the perpendicular magnetized film.

Therefore, the rotation of polarized plane of the light beam reflected off the first magnetic layer 101 becomes larger than the rotation of polarized plane of the light beam reflected off the second magnetic layer 102 and the rotation of polarized plane of the light beam reflected off the first magnetic layer 101 is given a priority. The light beam reflected off the first magnetic layer 101 and the second magnetic layer 102 is detected by a detector, converted to an electric signal, and passed through a signal processing system to read information.

(Embodiment 5)

Figure 22:
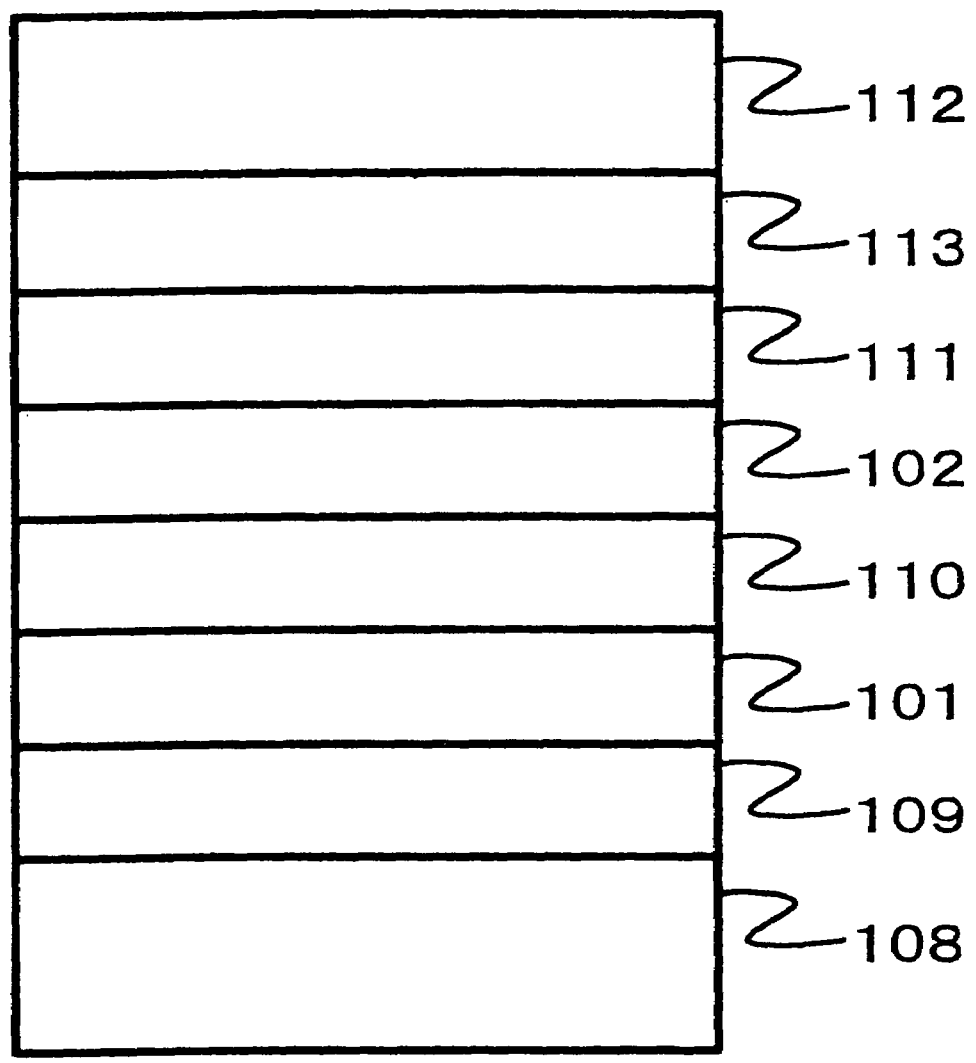
FIG. 22 is a view showing a magneto-optical recording medium according to the fifth embodiment.

A fifth embodiment will be described below. FIG. 22 is a sectional view showing the magneto-optical recording medium according to the present embodiment. In the present embodiment, the magneto-optical recording medium was prepared to have the 30 nm thickness of GdFeCo film corresponding to the first magnetic layer 101 of the embodiment 4. Specifically, in the configuration thereof, the first dielectric layer 109, the first magnetic layer 101, second dielectric layer 110, the second magnetic layer 102, the third dielectric layer 111, the heat releasing layer 113, and the overcoat layer 112 are sequentially formed on the substrate 108, the GdFeCo film being the first magnetic layer 101 is made 30 nm, and a heat releasing layer 113 is put between the SiN film being the third dielectric layer 111 and the overcoat layer 112. The substrate 108 is a substrate made of poly-carbonate with the track width of 0.6 μm.

The AlTi film, the heat releasing layer 113, was formed by fitting an AlTi alloy target to one of the cathode of the sputtering machine used in the present embodiment and carrying out vacuum exhaust up to $2\times10^{-7}$ Torr for inside of the chamber. After vacuum exhaust, Ar gas of $1.5\times10^{-3}$ Torr was introduced in the chamber. After introducing Ar gas, electric power of 600 W was applied and the DC sputtering was applied to forming the AlTi film. Other films were formed by the DC sputtering under the same film forming condition as that of the magneto-optical recording medium according to the present embodiment 4 using the same sputtering machine as that of the magneto-optical recording medium according to the present embodiment 4.

Figure 23:
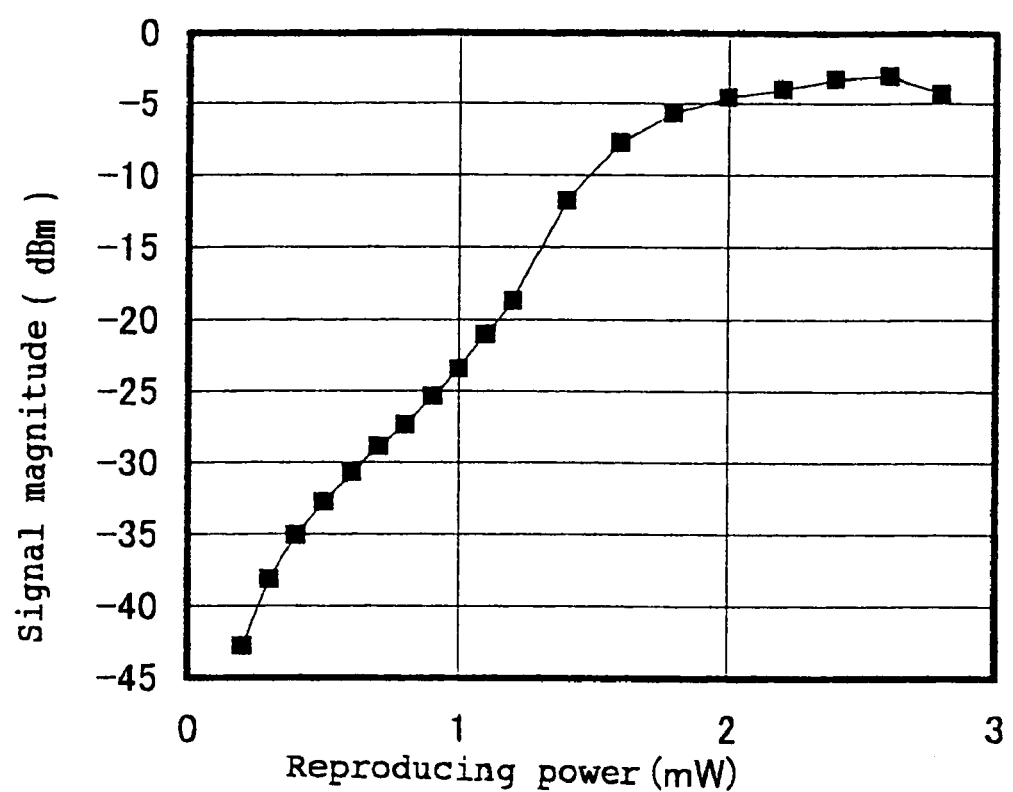
FIG. 23 is a view showing a relationship between the signal quantity and the reproducing power in the magneto-optical recording medium according to the fifth embodiment of the present invention.
Figure 24:
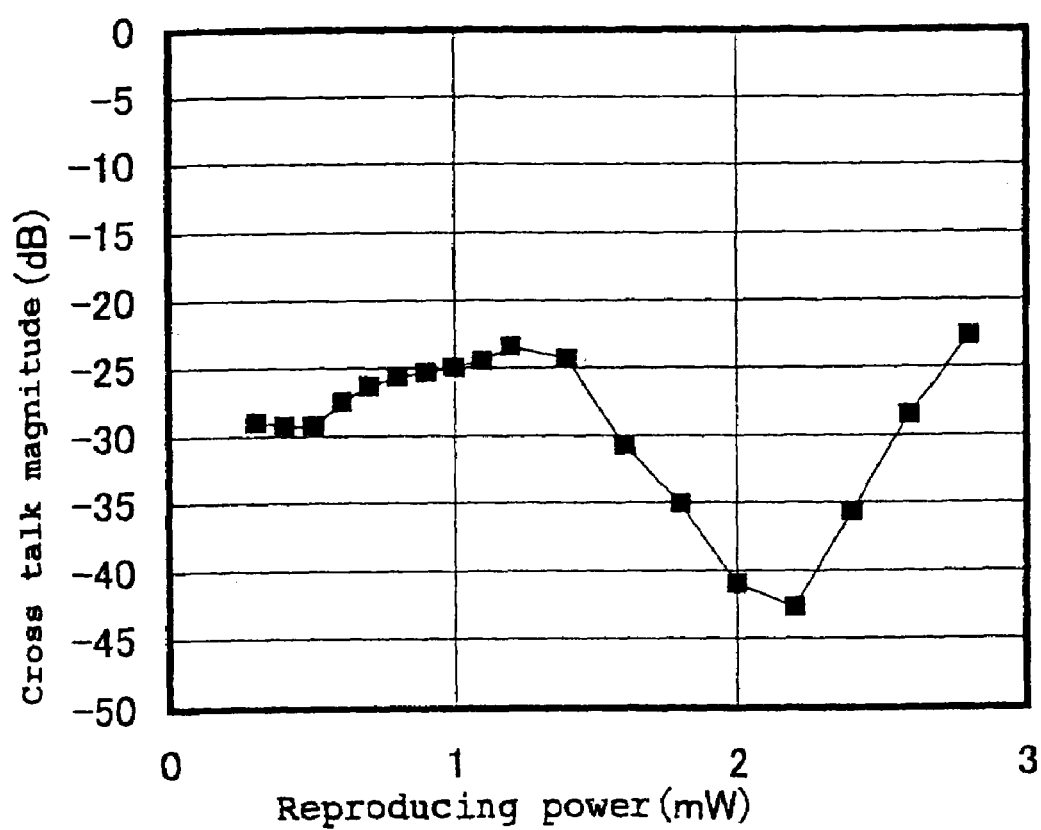
FIG. 24 is a view showing a relationship between the cross talk quantity and the reproducing power in the magneto-optical recording medium according to the fifth embodiment of the present invention.

In the present embodiment, the recording and reproducing of the signal in and from the magneto-optical recording medium were performed by the same method as the present embodiment 4. FIG. 23 is a view showing a relationship between the signal magnitude and the reproducing power in the magneto-optical recording medium according to the present embodiment and FIG. 24 is a view showing a relationship between the cross talk magnitude and the reproducing power in the magneto-optical recording medium according to the present embodiment.

Also in the abutting tracks 106 in the present embodiment, the light beam reflected off the first magnetic layer 101 and the light beam passed through the first magnetic layer 101 and reflected off the second magnetic layer 102 cancel each other in opposite directions of the rotation directions of polarized planes. Therefore, an effect of reducing cross talk yielded around the reproducing power as same as that of the present embodiment 4.

(Embodiment 6)

A sixth embodiment will be described below. The present embodiment is configured by that the first dielectric layer 109, the first magnetic layer 101, a second dielectric layer 110, the second magnetic layer 102, the third dielectric layer 111, the heat releasing layer 113, and the overcoat layer 112 are sequentially formed on the substrate 108, the thickness of the GdFeCo film being the first magnetic layer 101 is made 40 nm, and the thickness of the SiN film being the second dielectric layer 110 is made 5 nm.

In the present embodiment, as same as the embodiment 5, the heat releasing layer 113 with a 35 nm thickness is put between the SiN film being the third dielectric layer 111 and the overcoat layer 112. The substrate 108 is a substrate, for sample servo system, made of poly-carbonate with the track width of 0.6 μm. Concerning film forming method and film forming conditions, films were formed by the DC sputtering under the same film forming condition as that of the magneto-optical recording medium according to the present embodiment 5 using the same sputtering machine as that of the magneto-optical recording medium according to the present embodiment 5.

Figure 25:
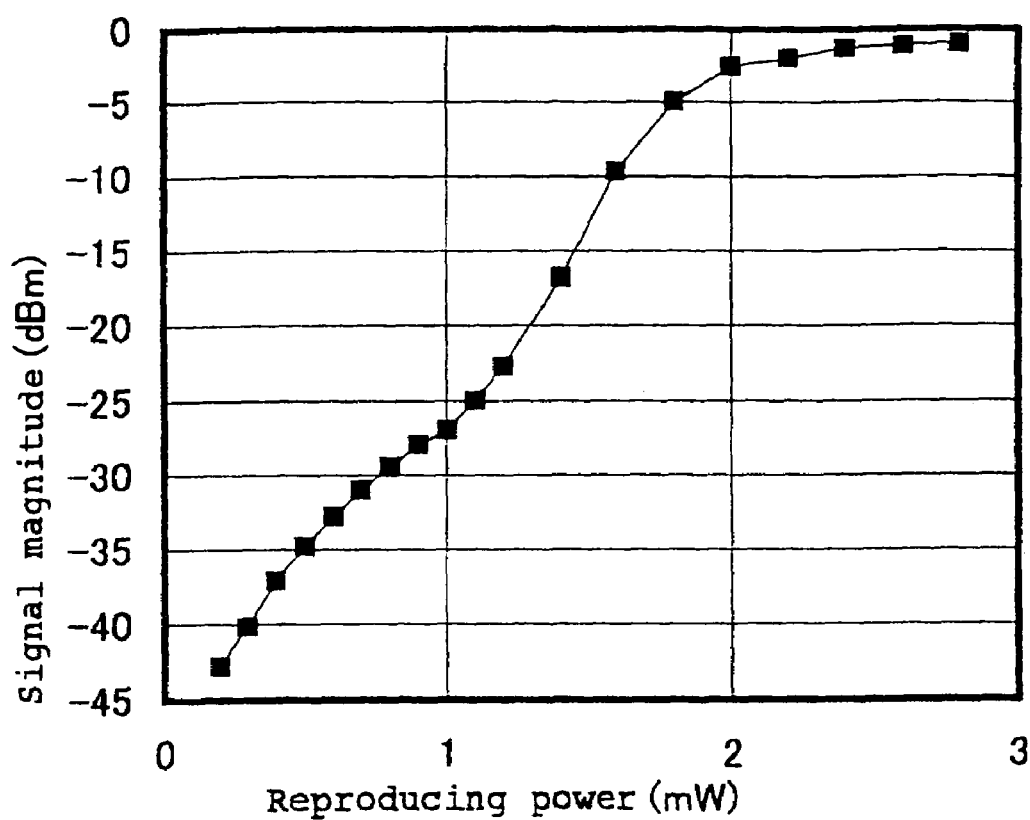
FIG. 25 is a view showing a relationship between the signal quantity and the reproducing power in a magneto-optical recording medium according to a sixth embodiment of the present invention.
Figure 26:
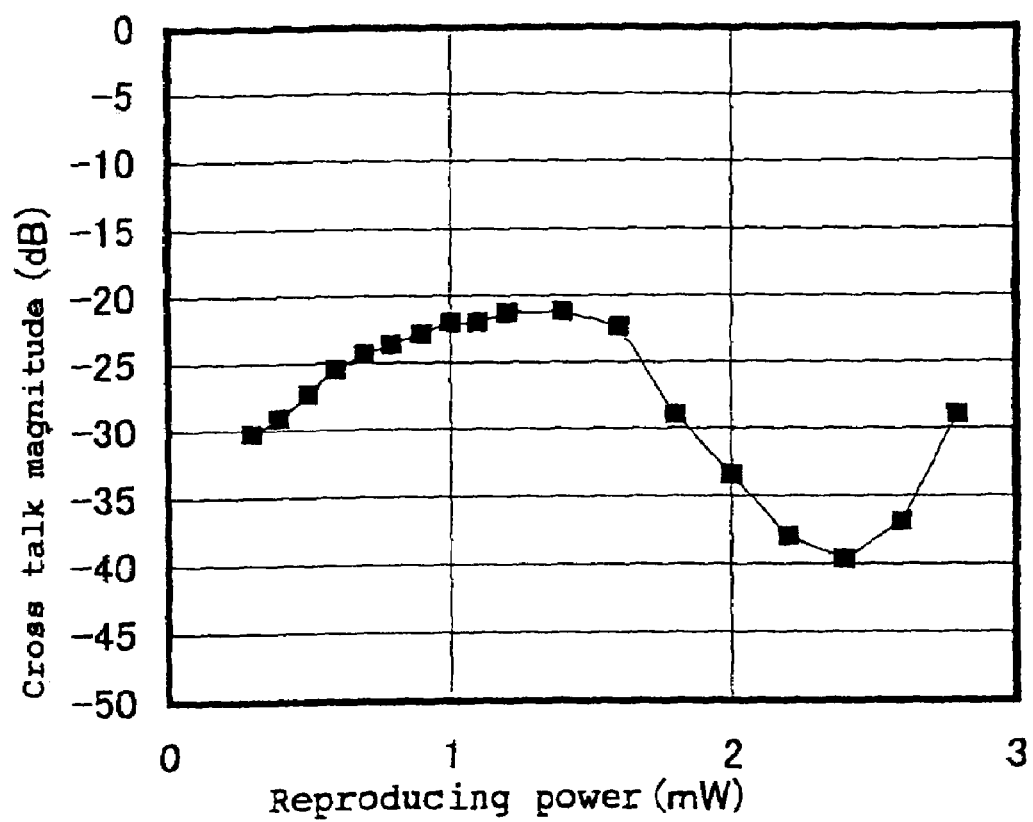
FIG. 26 is a view showing a relationship between a cross talk quantity and reproducing power in the magneto-optical recording medium according to the sixth embodiment of the present invention.
Figure 27:
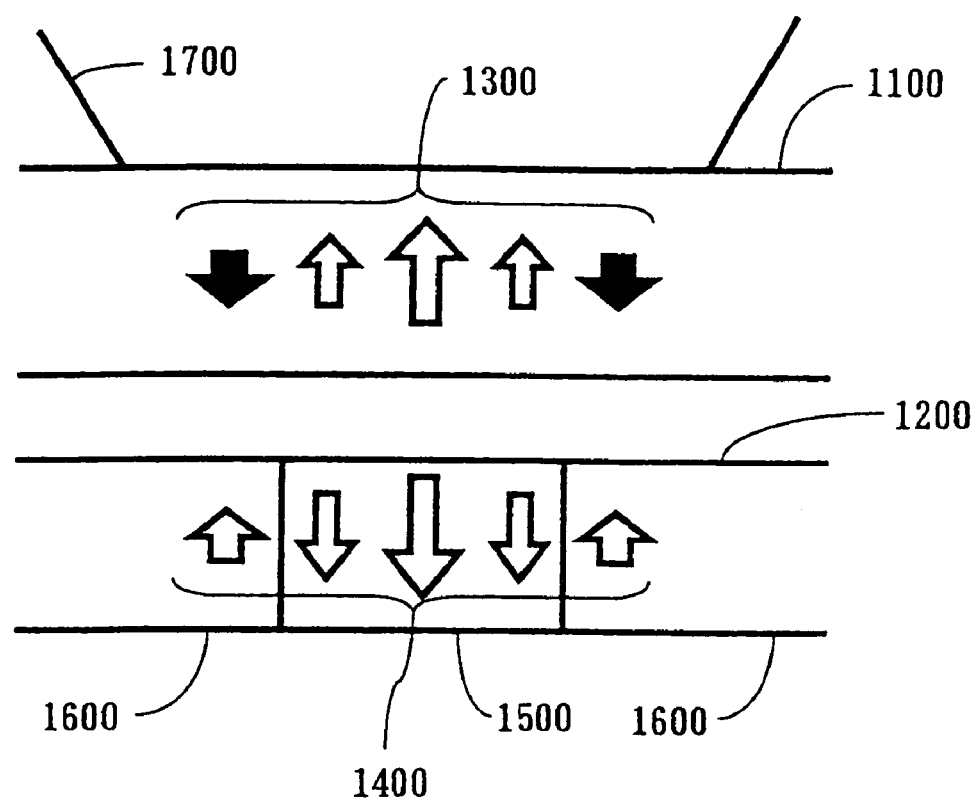
FIG. 27 is a view showing a vertical component of a magnetic moment of the sub-lattice of the transition metal in a magneto-optical recording medium at a reproducing according to the prior art.

In the present embodiment, the recording and reproducing of the signal in and from the magneto-optical recording medium were performed by the same method as the present embodiment 4. FIG. 25 is a view showing a relationship between the signal magnitude and the reproducing power in the magneto-optical recording medium according to the present embodiment and FIG. 26 is a view showing a relationship between the cross talk magnitude and the reproducing power in the magneto-optical recording medium according to the present embodiment.

Also in the abutting tracks 106 in the present embodiment, the light beam reflected off the first magnetic layer 101 and the light beam passed through the first magnetic layer 101 and reflected off the second magnetic layer 102 cancel each other in opposite directions of the rotation directions of polarized planes. Therefore, the effect of reducing cross talk yielded around the reproducing power as same as those of the present embodiment 4 and the present embodiment 5.

(Embodiment 7)

An embodiment 7 will be described below. The present embodiment is configured by that the first dielectric layer 109, the first magnetic layer 101, a second dielectric layer 110, the second magnetic layer 102, the third dielectric layer 111, the heat releasing layer 113, and the overcoat layer 112 are sequentially formed on the substrate 108 and the magneto-optical recording medium was prepared changing the composition of GdFeCo film being the first magnetic layer 101.

In the present embodiment, the composition of the first magnetic layer 101 was made in a proportion of Gd25.0Fe66.7 Co8.3 (atomic percentage) and with a film thickness of 30 nm. The thickness of the SiN film being the second dielectric layer 110 was made 10 nm. As same as the embodiment 5, the heat releasing layer 113 with a 35 nm thickness is put between the SiN film being the third dielectric layer 111 and the overcoat layer 112. The substrate 108 is a substrate made of poly-carbonate with the track width of 0.8 μm. Concerning film forming method and film forming conditions, films were formed by the DC sputtering under the same film forming condition as that of the magneto-optical recording medium according to the present embodiment 5 using the same sputtering machine as that of the magneto-optical recording medium according to the present embodiment 5.

Comparison of the case where the composition of the first magnetic layer 101 was Gd25.0Fe66.7Co8.3 (atomic percentage) with the case where the composition was that of the embodiment 5 showed a lower temperature region of change from the in-plane magnetized film to the perpendicular magnetized film in the present embodiment. However, setting the reproducing power low allows magnetically induced super resolution action and achievement of recording and reproducing with the high density in the composition of the present embodiment.

In the present embodiment, recording and reproducing of the signal in the magneto-optical recording medium were performed by the same method as the present embodiment 4.

Also in the present embodiment in which the composition of the first magnetic layer 101 was Gd25.0Fe66.7Co8.3 (atomic percentage) in the abutting tracks 106, the light beam reflected off the first magnetic layer 101 and the light beam passed through the first magnetic layer 101 and reflected off the second magnetic layer 102 cancel each other in opposite directions of the rotation directions of polarized planes. Therefore, the following effect as same as that of the present embodiment 5 yielded: cross talk magnitude showed −20 dB or smaller in a wide range of the reproducing power, particularly, cross talk magnitude showed −25 dB or smaller in the reproducing power ranging 1.2 mW and 2.2 mW.

(Embodiment 8)

The present embodiment has same configuration as that of the embodiment 7 and is the magneto-optical recording medium prepared by increasing the proportion of rare-earth elements in the composition of the first magnetic layer 101 as Gd35.4Fe 56.3Co 8.3 (atomic percentage,) in contrast to the embodiment 7. The configuration was made by sequential forming of the first dielectric layer 109, the first magnetic layer 101, a second dielectric layer 110, the second magnetic layer 102, the third dielectric layer 111, the heat releasing layer 113, and the overcoat layer 112 on the substrate 108. The thickness of the first magnetic layer 101 was 30 nm. As same as that of the embodiment 7, the thickness of the SiN film being the second dielectric layer 110 was made 10 nm. As same as those of the embodiment 5 and the embodiment 7, the heat releasing layer 113 with the 35 nm thickness was put between the SiN film being the third dielectric layer 111 and the overcoat layer 112. The substrate 108 is a substrate made of poly-carbonate with the track width of 0.7 μm. Concerning film forming methods and film forming conditions, films were formed by the DC sputtering under the same film forming condition as that of the magneto-optical recording medium according to the present embodiment 5 using the same sputtering machine as that of the magneto-optical recording medium according to the present embodiment 5.

Comparison of the case where the composition of the first magnetic layer 101 was Gd35.4Fe56.3Co8.3 (atomic percentage) with the case where the composition was that of the embodiment 5 showed a higher temperature region for change from the in-plane magnetized film to the perpendicular magnetized film in the present embodiment. However, setting the reproducing power high allows magnetically induced super resolution action and achievement of recording and reproducing with the high density in the composition of the present embodiment. In this case, increasing the Curie point of the second magnetic layer 102 yields a higher effect.

In the present embodiment, recording and reproducing of the signal in the magneto-optical recording medium were performed by the same method as the present embodiment 4.

Also in the present embodiment in which the composition of the first magnetic layer 101 was Gd35.4Fe56.3Co8.3 (atomic percentage) in the abutting tracks 106, the light beam reflected off the first magnetic layer 101 and the light beam passed through the first magnetic layer 101 and reflected off the second magnetic layer 102 cancel each other in opposite directions of the rotation directions of polarized planes. Therefore, the following effect as same as that of the present embodiment 5 yielded: cross talk magnitude showed −20 dB or smaller in a wide range of the reproducing power, particularly, cross talk magnitude showed −25 dB or smaller in the reproducing power ranging 2.0 mW and 3.0 mW.

According to the above described respective embodiments, the magneto-optical recording medium having the configuration using the disk substrate made of poly-carbonate or poly-olefin and comprising a spiral or annular guide groove or the serpentined pit for tracking guide of the light spot has been mentioned. However, the disk substrate of the configuration having a serpentined spiral guide groove having an address information or the pre-pit for tracking guide of sample surbo system, on the disk substrate may be used.

In the embodiment of the present invention, the substrate used was of the track width of 0.6 μm to 0.8 μm. However, the substrate having 1 μm or narrower shows same or similar effect as above.

Figure 28:
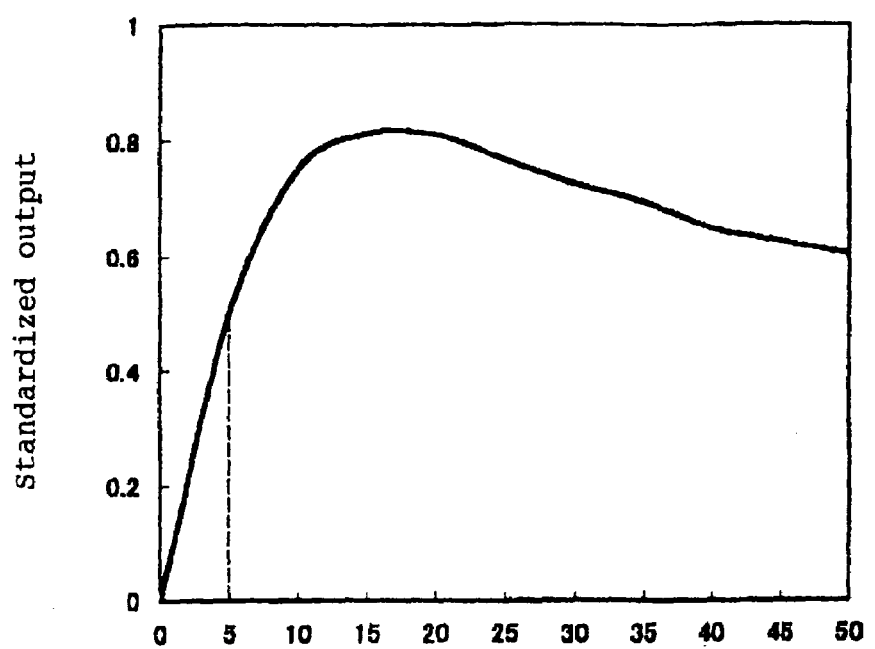
FIG. 28 is a view showing a relationship between a film thickness of a magnetic layer and a normalized signal in a magneto-optical recording medium according to an eighth embodiment of the present invention.

The configuration is that, in the abutting tracks 106 through which the light beam passes, the light beam reflected off the first magnetic layer 101 and the light beam passed through the first magnetic layer 101 and reflected off the second magnetic layer 102 cancel each other in opposite directions of the rotation directions of polarized planes. Thus, the thickness of the first magnetic layer 101 is preferably 40 nm or thinner in consideration of the relationship between the thickness of the first magnetic layer 101 and the normalized signal shown in the FIG. 28, more preferably, 30 nm or thinner to yield the higher effect. However, the thickness less than 5 nm does not yield a satisfactory reproducing signal and therefore, a thickness of 5 nm or thicker, more preferably 8 nm or thicker.

For the first magnetic layer 101 of the embodiment of the present invention, GdFeCo with the composition allowing becoming in-plane magnetized film and the perpendicular magnetized film at room temperature and the high temperature, respectively, was used. Even if the composition of the first magnetic layer 101 is that other than the above described embodiment, the composition yields the same effect, if having the characteristics allowing becoming in-plane magnetized film and the perpendicular magnetized film at room temperature and the high temperature, respectively.

Even if the composition of the first magnetic layer 101 is that made of the rare-earth elements-transition metal alloy, such as GdTbFeCo, GdDyFeCo, and DyFeCo, other than the GdFeCo alloy, the composition yields the same effect if having the characteristics allowing becoming in-plane magnetized film and the perpendicular magnetized film at room temperature and the high temperature, respectively.

Even if the composition of the first magnetic layer 101 is made by adding such metals as Cr or Al to the rare-earth elements-transition metal alloy, the composition yields the same effect if having the characteristics allowing becoming in-plane magnetized film and the perpendicular magnetized film at room temperature and the high temperature, respectively.

In the embodiment of the present invention, TbFeCo alloy with the composition consisting of Tb22.1Fe71.2 Co6.7 (atomic percentage) was used for the second magnetic layer 102. Even the composition other than the above described composition yields the same effect, if the composition has a large coercivity at room temperature, is the perpendicular magnetized film at room temperature, and keeps the recorded information.

As the recording film structure, the magneto-optical recording medium having the configuration by layering a plurality of the magnetic films such as TbFeCo, TbFe, and GdFeCo has been mentioned. However, a film made of rare-earth transition metal amorphous alloy such as TbCo, GdCo, GdTbFe, GdTbFeCo, and DyFeCo, or MnBi, PtMnSn, an magneto-optic material using a polycrystal material, or garnet, platinum group-transition metal alloy such as PtCo, and PdCo, a gold and platinum group-transition metal periodical structure alloy may be used. Or, the recording film structure containing them and configured by a plurality of the magnetic films different in materials or compositions may be used. On the other hand, an element such as Cr, Al, Ti, Pt, and Nb may be added to the above described magnetic film to improve reliability.

Concerning the recording layer and the transfer control layer which are layered on the reproduction layer and the intermediate layer, the configuration having the recording layer of a thickness ranging from 30 nm to 50 nm, and the transfer control layer of a thickness ranging from 30 nm to 35 nm has been mentioned above. The thickness is not restricted to those described above and may be a film thickness configuration satisfying a sufficient magnetic coupling force between the recording layer and the reproduction layer to satisfy the characteristics of the present invention. More preferably, the thickness of both the recording layer and the reproduction layer are in the range from 10 nm to 200 nm to yield an equal effect.

The configuration in which the transfer control layer is arranged in a side far from the recording layer in view from a side of light incidence has been mentioned above. However, when a configuration allows an abrupt change of the magnetic field transferred to the reproduction layer, the configuration in which the recording layer is arranged in a side far from the transfer control layer in view from a side of light incidence may be employed.

Magneto-optical recording medium and reproducing method thereof or the enlarging and reproducing method of the reproduction magnetic domain by shrinking action in the case of applying the magnetically induced super resolution reproducing of the CAD system by using the recording film structure of the multilayer configuration has been described so far. Applying such recording and reproducing methods to achieve a high signal quality and high recording density as other FAD system, RAD system, or other magnetically induced super resolution system or the domain enlarging and reproducing method by the domain wall moving type, or the reproducing method of the reproducing magnetic field alternation type, use of a configuration having the transfer control layer yields an equal or a better result at the time of reproducing and transferring the recording magnetic domain.

On the other hand, using the configuration of the present invention for magneto-optical recording medium having the recording film configuration applying the magnetostatic coupling for the direct overwrite system of the light modulation yields the magneto-optical recording medium and recording and reproducing method thereof excellent for abrupt transfer property.

In the third embodiment of the present invention, the configuration using the reproduction layer has been so far described. As the other configuration, a recording assist layer or the like may be added.

In case of using a nonmagnetic blocking layer as the intermediate layer, a dielectric film or a nonmagnetic alloy film may be appropriate. Besides, in case of the above described nonmagnetic alloy film, using a configuration having a reflecting layer of a nonmagnetic alloy further containing at least Al, Cu, Ag, Au can improve characteristics. The intermediate layer composed of the reflecting layer and the dielectric layer may be put on.

In the embodiment of the present invention, SiN was used for the first dielectric layer 109, the second dielectric layer 110, and the third dielectric layer 111. The same effect is yielded by using a dielectric layer such as a nitride such as AlN and SiAlN films, an oxide such as SiO and AlO, a chalcogen compound such as ZnS and ZnTe, or a nonmagnetic material other than dielectric layer material.

In case of using the magnetic film as the intermediate layer, the intermediate layer of which domain wall energy is smaller than these layers may be put between the recording layer and the reproduction layer (or the domain enlarging layer.)

The configuration in which the heat sink layer made from a metal is put on the transfer control layer through the dielectric layer has been described so far, the configuration may be that having the heat sink layer, made from a metal, which is arranged directly on the transfer control layer or the recording layer.

The configuration may be that in which the metal made reflecting layer is further put in.

The same effect can be yielded by using a metal film such as AlTi, AlCr, Cu, Au, and Ag or a film having large heat conductivity and containing at least one species thereof, replacing to the heat releasing layer.

According to the configuration of the embodiment of the present invention as described above, the film thickness of the first magnetic layer can be decreased to 40 nm or thinner. Therefore, reduction of cost for material is possible and time for preparing a film can be shorten to improve productivity greatly.

In addition, preparing a thin film is possible. Thus, heat dispersion and heat absorbency are improved. Temperature distribution inside the magnetic layer in the region on which the beam spot is radiated can be made abrupt to improve resolution in the magnetically induced super resolution system.

According to the present invention as described above, making the thickness of the first magnetic layer thinner provides a narrowed track and a distinct effect of high density recording by that the light beam reflected off the first magnetic layer and the light beam reflected off the second magnetic layer cancel each other, the recorded information in the second magnetic layer is sufficiently masked in a temperature from the room temperature to the high temperature, and reproducing the recorded information is sufficiently made possible in the high temperature region in the beam spot, in the region changing from the in-plane magnetized film to the perpendicular magnetized film in the beam spot at the time of reproduction.

What is claimed is:

1. A method of manufacturing a magneto-optical recording medium, comprising forming, in a stacking manner, on a disk substrate:
   a recording layer having a recording magnetic domain in which information is recorded according to a magnetization direction vertical to a surface of a film;
   a transfer control layer magnetically coupled to the recording layer, wherein the transfer control layer is a magnetic film, the magnetic film has a direction of magnetization opposite to the direction of magnetization of the recording layer, in the temperature range below the temperature at which the reproduction magnetic domain is transferred to the reproduction layer; and
   a reproduction layer to which information recorded in the recording layer is transferred to form a reproduction magnetic domain of the magnetization direction vertical to the surface of the film by magnetic coupling, wherein
   when the magnetic film is in at least part of the temperature range in which the reproduction magnetic domain of the reproduction layer transferred from the recording layer via a reproduction assist layer is stable, the magnetic film is at a temperature equal to or above a Curie point.

2. A method of manufacturing a magneto-optical recording medium, comprising forming, in a stacking manner, on a disk substrate:
   a recording layer having a recording magnetic domain in which information is recorded according to a magnetization direction vertical to a surface of a film;
   a transfer control layer magnetically coupled to the recording layer, wherein the transfer control layer is a magnetic film, the magnetic film has a direction of magnetization opposite to the direction of magnetization of the recording layer, in the temperature range below the temperature at which the reproduction magnetic domain is transferred to the reproduction layer; and
   a reproduction layer to which information recorded in the recording layer is transferred to form a reproduction magnetic domain of the magnetization direction vertical to the surface of the film by magnetic coupling, wherein
   when the magnetic film is in at least part of the temperature range in which the reproduction magnetic domain of the reproduction layer transferred from the recording layer is stable, the magnetic film has a direction of magnetization identical with the direction of magnetization of the recording layer.

3. The method of manufacturing a magneto-optical recording medium according to claim 1, wherein
   the transfer control layer has, during reproducing the recorded information, in the spot of reproducing light radiated, a region of a critical temperature at which the magnetization of the recording layer and the magnetization of the transfer control layer are opposite in direction and identical in magnitude between each other.

4. A method of reproducing information of a magneto-optical recording medium by transferring a recording magnetic domain recorded on a recording layer to a reproduction layer, the magneto-optical recording medium comprising:
   the recording layer having a recording magnetic domain in which information is recorded according to a magnetization direction vertical to a surface of a film;
   a transfer control layer magnetically coupled to the recording layer; and
   the reproduction layer to which information recorded in the recording layer is transferred to form a reproduction magnetic domain of the magnetization direction vertical to the surface of the film, the method comprising:
   a temperature elevation step of, during reproduction, irradiating laser beam on the magneto-optical recording medium, wherein a temperature range below the temperatures at which the reproduction magnetic domain is transferred to the reproduction layer within a light spot on the magneto-optical recording medium heated by the irradiation of laser beam including a temperature at which the direction of magnetization of the recording layer and the direction of magnetization of the transfer control layer are opposite to each other, and
   a reproduction step of detecting information by transferring the recording magnetic domain from the recording layer to the reproduction layer only in a temperature range in which the information can be transferred from the recording layer in response to coincidence between the direction of magnetization of the recording layer and the direction of magnetization of the transfer control layer in at least part of the temperature range in which the reproduction magnetic domain of the reproduction layer transferred from the recording layer is stable.

5. The method of reproducing information of a magneto-optical recording medium according to claim 4, wherein, at the step of reproduction, when the transfer control layer is in at least part of the temperature range in which the reproduction magnetic domain of the reproduction layer transferred from the recording layer via a reproduction assist layer is stable, the transfer control layer is at a temperature equal to or above a Curie point.

6. The method of reproducing information of a magneto-optical recording medium according to claim 4, wherein, at the step of reproduction, the transfer control layer has, during reproducing the recorded information, in the spot of reproducing light radiated, a region of a critical temperature at which the magnetization of the recording layer and the magnetization of the transfer control layer are opposite in direction and identical in magnitude between each other.

7. The method of reproducing information of a magneto-optical recording medium according to claim 4, wherein, at the step of reproduction, the information is detected by expanding the size of the recording magnetic domain transferred to the reproduction layer.

8. The method of manufacturing a magneto-optical recording medium according to claim 2, wherein
   the transfer control layer has, during reproducing the recorded information, in the spot of reproducing light radiated, a region of a critical temperature at which the magnetization of the recording layer and the magnetization of the transfer control layer are opposite in direction and identical in magnitude between each other.

* * * * *